(12) United States Patent
Yamamoto et al.

(10) Patent No.: US 6,462,454 B2
(45) Date of Patent: Oct. 8, 2002

(54) ROTARY ELECTRIC MACHINE

(75) Inventors: Kyouhei Yamamoto; Toshinori Tanaka, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 123 days.

(21) Appl. No.: 09/727,074

(22) Filed: Dec. 1, 2000

(65) Prior Publication Data

US 2001/0038252 A1 Nov. 8, 2001

(30) Foreign Application Priority Data

May 2, 2000 (JP) ........................................ 2000-133884

(51) Int. Cl.$^7$ ............................................... H02K 3/04
(52) U.S. Cl. ........................ 310/207; 310/198; 310/185
(58) Field of Search ............................... 310/198, 184, 310/185, 204, 207

(56) References Cited

U.S. PATENT DOCUMENTS

| 4,583,016 | A | * | 4/1986 | Ban et al. .............. 310/154.05 |
| 4,598,222 | A | * | 7/1986 | Matsunaga et al. ......... 310/198 |
| 4,827,172 | A | * | 5/1989 | Kobayashi ........... 174/DIG. 21 |
| 5,072,129 | A | * | 12/1991 | Sugiyama .................... 290/48 |
| 5,128,577 | A | * | 7/1992 | Kobayashi .................. 310/233 |
| 5,191,250 | A | * | 3/1993 | Kobayashi .................. 310/198 |
| 5,202,599 | A | * | 4/1993 | Kao ....................... 310/154.47 |
| 5,698,921 | A | * | 12/1997 | Morimoto .............. 310/154.22 |
| 6,075,305 | A | * | 6/2000 | Daikoku et al. ............ 310/128 |

FOREIGN PATENT DOCUMENTS

| EP | 0419293 A1 | * | 3/1991 |
| JP | 56-149565 | | 4/1980 |
| JP | 59-86847 | | 6/1984 |

* cited by examiner

*Primary Examiner*—Joseph Waks
(74) *Attorney, Agent, or Firm*—Sughrue Mion, PLLC

(57) ABSTRACT

A rotary electric machine of the present invention includes a yoke, a multi-polar magnetic field portion composed of 4 poles fixed to the inner wall of the yoke, a shaft disposed within the yoke so as to be able to rotate freely, an armature fixed to the shaft having a winding composed of a conductor wire wound by double wave winding into an even number of slots formed on the outer circumferential surface of a core so as to extend in the axial direction thereof, a commutator comprising a plurality of segments fixed to an end portion of the shaft, and a plurality of brushes contacting the surface of the commutator. With this arrangement, there can be obtained a rotary electric machine capable of reducing operation noise.

15 Claims, 44 Drawing Sheets

FIG. 3
(a)                 (b)
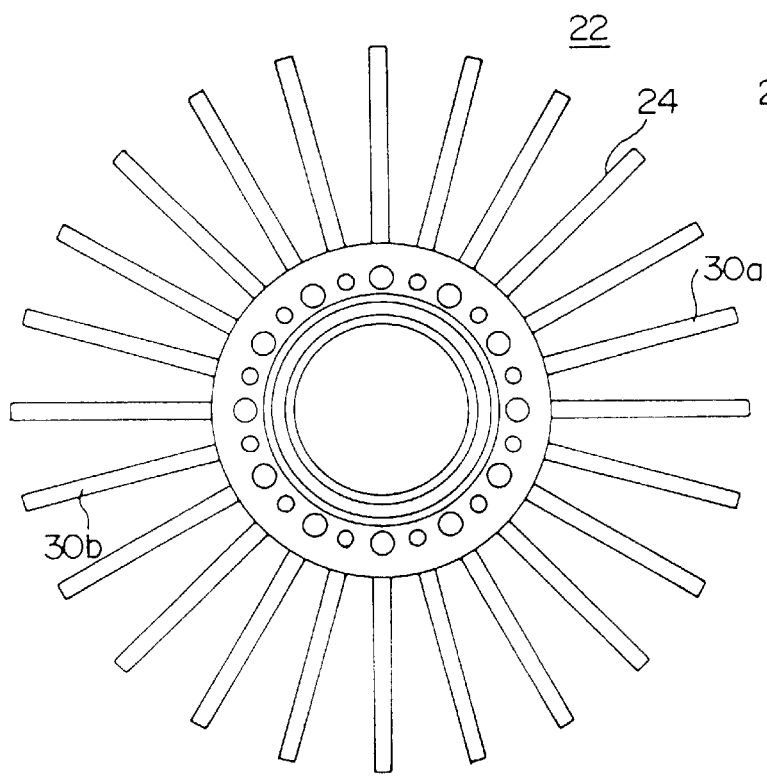
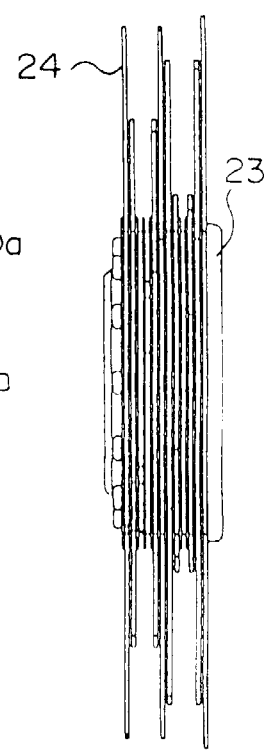

FIG. 23

| NUMBER OF POLES | NUMBER OF SLOTS | CLASSIFICATION OF NUMBER OF SLOTS | | | TORQUE RIPPLE [%] | FORCE IN RADIAL DIECTION [N] |
|---|---|---|---|---|---|---|
| | | EVEN | INTEGER MULTIPLE OF NUMBER OF POLE PAIRS | INTEGER MULTIPLE OF NUMBER OF POLES | | |
| 4 | 20 | ○ | ○ | ○ | 11.1 | 0 |
| 4 | 21 | × | × | × | 0.096 | 1.79 |
| 4 | 22 | ○ | ○ | × | 0.876 | 0 |
| 4 | 24 | ○ | ○ | ○ | 7.12 | 0 |
| 4 | 26 | ○ | ○ | × | 0.846 | 0 |
| 4 | 28 | ○ | ○ | ○ | 3.37 | 0 |

FIG. 27

| NUMBER OF POLES | NUMBER OF SLOTS | CLASSIFICATION OF NUMBER OF SLOTS | | TORQUE RIPPLE (%) | FORCE IN RADIAL DIRECTION (N) |
|---|---|---|---|---|---|
| | | INTEGER MULTIPLE OF NUMBER OF POLE PAIRS | INTEGER MULTIPLE OF NUMBER OF POLES | | |
| 6 | 21 | ○ | × | 1.76 | ○ |
| 6 | 24 | ○ | ○ | 8.64 | ○ |
| 6 | 27 | ○ | × | 1.20 | ○ |

FIG. 56
2P14S MACHINE
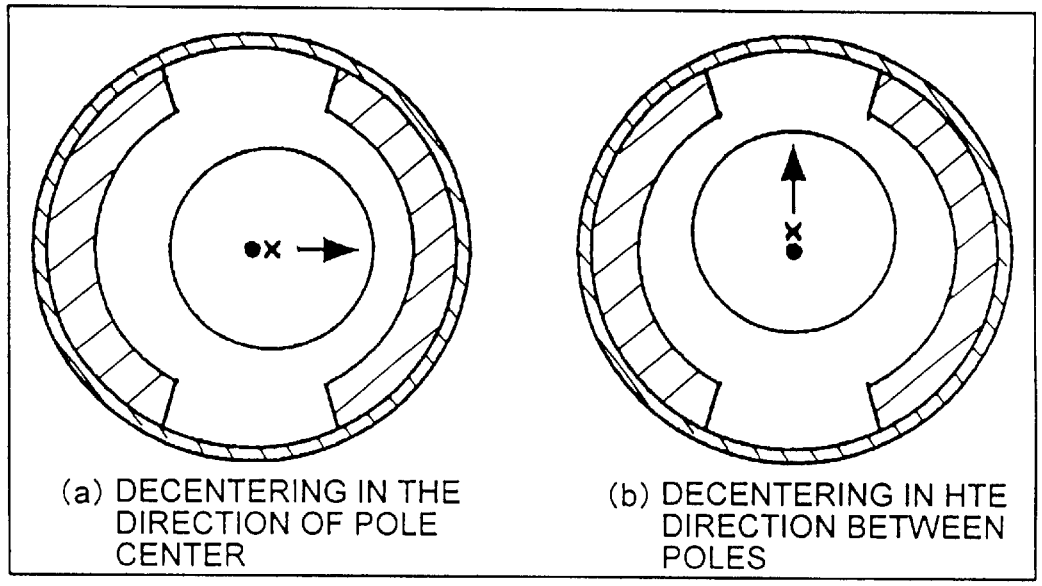
(a) DECENTERING IN THE DIRECTION OF POLE CENTER
(b) DECENTERING IN HTE DIRECTION BETWEEN POLES
4P21S MACHINE
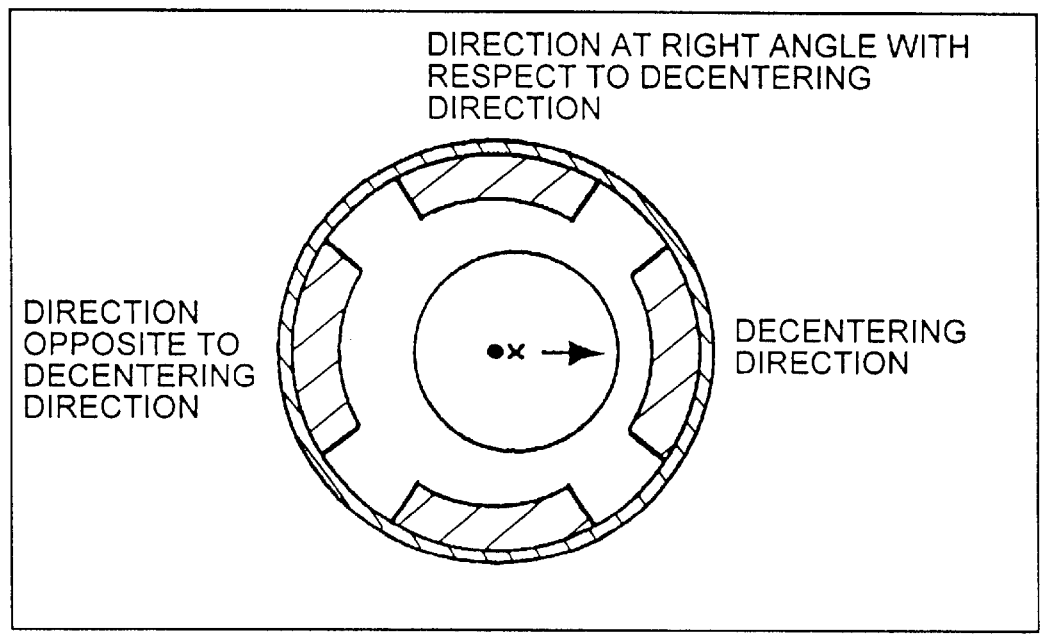

FIG. 57
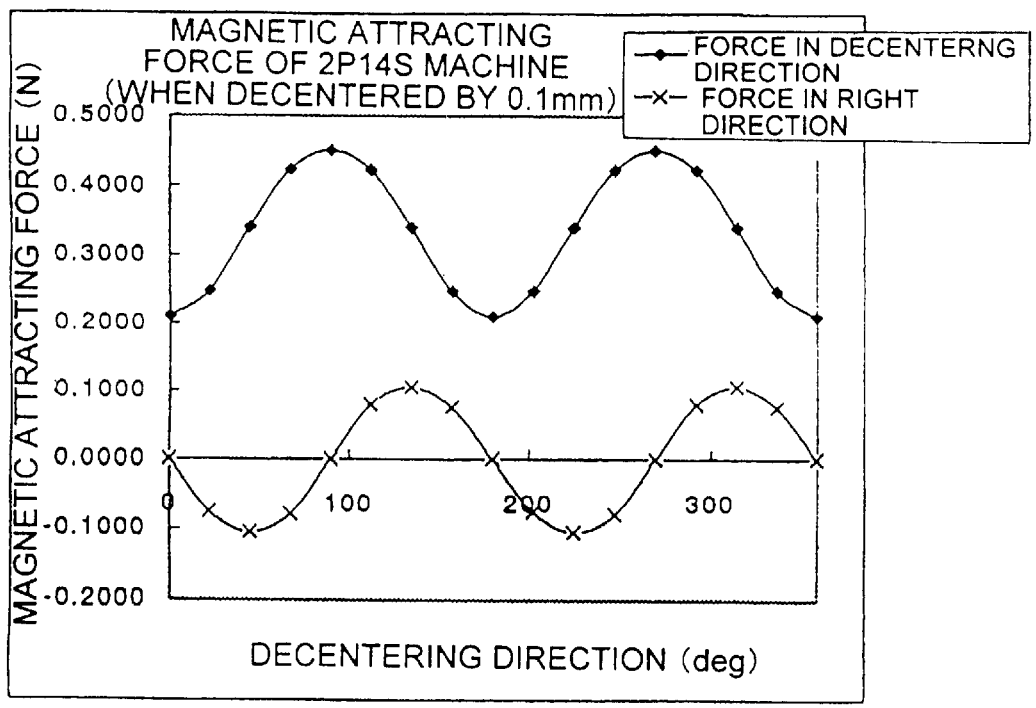
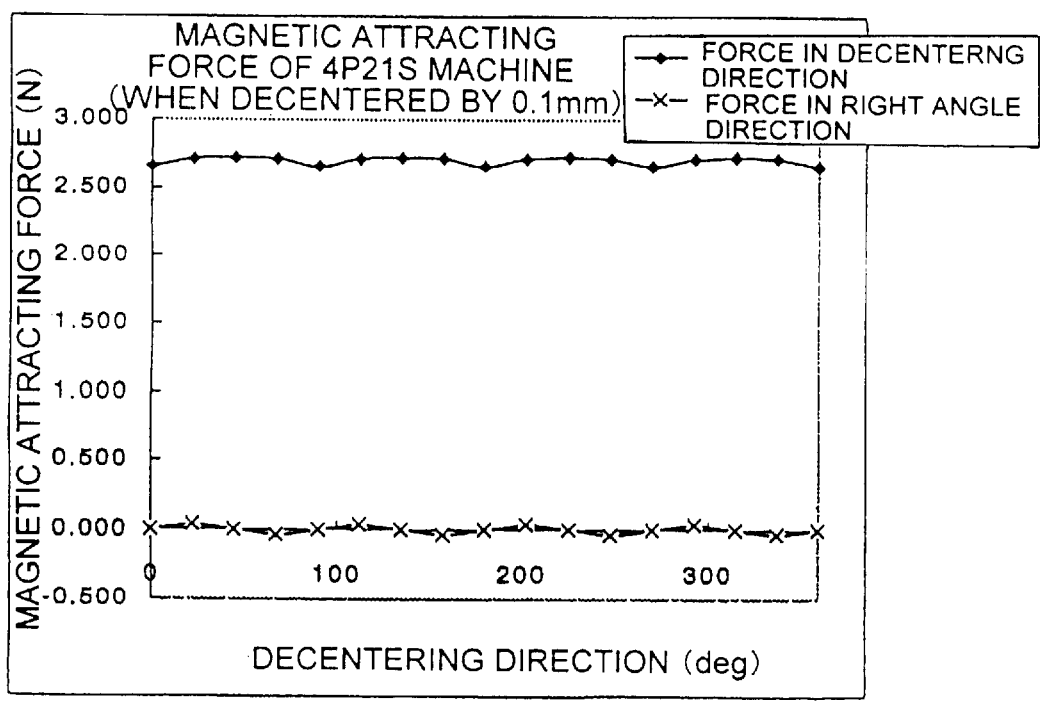

ROTARY ELECTRIC MACHINE

BACKGROUND OF THE INVENTION

1. Field of the Invention

The present invention relates to a rotary electric machine applied to a motor for an electric power steering assembly for assisting, for example, the steering force of a steering wheel of a vehicle.

2. Description of the Related Art

FIG. 55 is a side sectional view of a conventional motor (hereinafter, referred to as an electric motor) 100 used in an electric power steering assembly. The electric motor 100 includes a cylindrical yoke 1, two field permanent magnets 2, which are fixed in the yoke 1 in confrontation with each other and disposed in the circumferential direction of the yoke 1, a shaft 4 rotatably disposed in the yoke 1 through a bearing 3, an armature 5 fixed to the shaft 4, a commutator 6, which is fixed to an end of the shaft 4 and composed of a plurality of copper segments 16, and brushes 8 abutted against the surface of the commutator 6 by the elastic force of a spring 7.

The armature 5 includes a core 9 having a plurality of slots 11 extending in an axial direction and a winding 10 having a conductive wire wound around the slots 11 by a lap-winding method.

In the electric motor 100, which employs the lap-winding method and has 2 poles, a current is supplied to the winding 10 from the outside through the brushes 8 abutted against the segments 16 to cause the armature 5 to rotate together with the shaft 4 by an electromagnetic action.

Since the electric motor 100 is mainly used in vehicles of comparatively light weight having a small amount of displacement, it has a small amount of assist torque, thus its operation noise is very low and is not almost felt even in a passenger compartment.

Incidentally, employment of a power steering assembly using a DC motor in place of a hydraulic power steering assembly is started to reduce fuel consumption and to decrease weight even in heavy vehicles having a medium and large amount of displacement to cope with social requirements for a saving in fuel and a reduction in exhaust gases. In this case, while an electric motor having a large amount of torque is necessary, when the motor is designed maintaining 2 poles and the lap-winding method, a size of the motor is increased. Thus, it is necessary to design a motor having multi-poles such as 4 poles to reduce the size of the motor and to generate a large amount of torque.

FIGS. 56 and 57 are views for comparing a DC motor having 2 poles and 14 slots (hereinafter, abbreviated as a 2-pole motor) and a DC motor having 4 poles and 21 slots (hereinafter, abbreviated as a 4-pole motor) as an example of a multi-pole motor. In the figures, the inventors determined a difference of magnetic attracting forces acting on the armatures of the 2-pole motor and the 4-pole motor by a field analysis when the armatures were operated at decentered positions. In FIG. 56, a symbol "•" shows a center of a stator, that is, an intrinsic center of rotation, and a symbol "x" shows a center of rotation in a decentered state. Then, as apparent from the above figures, it can be found that the 4-pole motor is more liable to generate oscillation and noise than the 2-pole motor.

That is, a force acting on each armature was examined when each armature was decentered from the intrinsic center thereof as a start point by the same decentering amount (decentering amount: 0.1 mm) in the respective angles in a decentering direction of from 0° to 360°. As a result, it was found that an electromagnetic attracting force of about 0.45 N acted on the 2-pole motor at a maximum in a decentering direction, whereas an electromagnetic attracting force of about 2.7 N (6 times that of the 2-pole motor) acted on the 4-pole motor at a maximum in a decentering direction. Remarkable directionality of the magnetic attracting force due to decentering is found in the 2-pole motor. When electromagnetic attracting forces in a decentering direction are compared as to a case in which the armature of the 2-pole motor is decentered in an inter-pole direction (angles in the decentering direction are 90° and 270°) and a case in which it is decentered in a pole center direction (angles in the decentering direction is 0 and 180°), a magnetic attaching force, which is twice that of the latter case, acts in the former case. In contrast, no remarkable directionality is found in the 4-pole motor. That is, a magnetic attracting force in a decentering direction is about 2.7 N at all the angles in the decentering direction of the from 0° to 360°, which means that "there exists a safe direction with respect to decentering in the 2-pole motor but there does not exist a safe direction in the 4-pole motor". It is contemplated that this difference relates to the above difference in the generation of oscillation and noise.

While it is necessary to achieve the multi-pole such as the 4-pole to design a motor having a reduced size and an increased amount of torque, there remains the problem of oscillation and noise.

Incidentally, there is contemplated, for example, an armature employing a single wave winding method, in addition to an armature employing the lap-winding method when the multi-pole is achieved to cope with a reduction in size and an increase of torque. While brushes as many as poles are ordinarily provided in the lap-winding, 2 brushes are generally provided in the single wave winding.

FIGS. 58 and 59 are views showing an electromagnetic attracting forces acting on armatures having 4 poles and 21 slots as an example of the multi-pole, wherein FIG. 58 shows a case employing a lap-winding and 4-brush method and FIG. 59 shows a case employing a single wave winding and 2-brush method.

In the comparison of both the figures, when an armature is rotated by 1 slot, a magnetic attracting force acts on the armature in a radially external direction at all times as shown by arrows "a" when the armature is of a single wave winding type, whereas when an armature is of a lap-winding type having the 21 slots, a magnetic attracting force acts thereon in a direction which is varied in a circumferential direction as shown by arrows "b". Thus, there is a problem that the armature of the lap-winding type having the 21 slots is liable to generate oscillation due to rotation and liable to generate noise accordingly.

Further, when an armature has multi-poles and an odd number of brushes and employs the lap-winding method, since there are caused differences in induced voltage between circuits of the winding of the armature by the influences of decentering of the armature, uneven currents flowing through brushes, machining errors and the like, circulating currents, which run through the brushes, are generated in the armature. As a result, there also arises a problem of an increase in operation noise due to increased temperatures of the brushes and a commutator, reduced lives thereof, and an increase in a torque rip, which are accompanied by deterioration of a rectifying action and an increase in rectifying sparks generated from the brushes, and the combined actions thereof.

In contrast, when an armature has multi-poles and an odd number of slots and employs the single wave winding method, there is a problem that the torque ripple is increased (the torque ripple is 0.096% in the lap-winding method of FIG. 58, whereas it is 1.37% in the single wave winding method of FIG. 59.).

SUMMARY OF THE INVENTION

An object of the present invention, which was made to solve the above problems, is to provide a rotary electric machine capable of lowering operation noise or the like.

To this end, according to the present invention, there is provided a rotary electric machine, comprising: a yoke; a multi-polar magnetic field portion composed of 4 poles fixed to the inner wall of said yoke; a shaft disposed within the yoke so as to be able to rotate freely; an armature fixed to the shaft having a winding composed of a conductor wire wound by double wave winding into an even number of slots formed on the outer circumferential surface of a core so as to extend in the axial direction thereof; a commutator comprising a plurality of segments fixed to an end portion of the shaft; and a plurality of brushes contacting the surface of the commutator.

According to another aspect of the present invention, there is provided a rotary electric machine, comprising: a yoke; a multi-polar magnetic field portion composed of 4 poles fixed to the inner wall of the yoke; a shaft disposed within the yoke so as to be able to rotate freely; an armature fixed to the shaft having a winding composed of a conductor wire wound by double wave winding into a number of slots being an integer multiple of the number of pairs of the poles, the slots being formed on the outer circumferential surface of a core so as to extend in the axial direction thereof; a commutator comprising a plurality of segments fixed to an end portion of the shaft; and a plurality of brushes contacting the surface of the commutator.

According to still another aspect of the present invention, there is provided a rotary electric machine comprising: a yoke; a multi-polar magnetic field portion composed of at least 6 poles fixed to the inner wall of the yoke; a shaft disposed within the yoke so as to be able to rotate freely; an armature fixed to the shaft having a winding composed of a conductor wire wound by multiple wave winding into a number of slots being an integer multiple of the number of pairs of the poles and being not an integer multiple of the number of the poles, the slots being formed on the outer circumferential surface of a core so as to extend in the axial direction thereof; a commutator comprising a plurality of segments fixed to an end portion of the shaft; and a plurality of brushes contacting the surface of the commutator.

BRIEF DESCRIPTION OF THE DRAWINGS

FIG. 3(*a*) is an unfolded front elevational view of an equalizer assembly shown in FIG. 1, and FIG. 3(*b*) is a side elevational view of the equalizer assembly shown in FIG. 3(*a*);

FIG. 23 is a table showing a relationship between a torque ripple and an electromagnetic attracting force of respective motors for an electric power steering assembly in systems of 4 poles, double wave winding, 20, 22, 24, 26, and 28 slots, and 4 brushes;

FIG. 27 is a table explaining a relationship between an electromagnetic attracting force and a torque ripple of motors for an electric power steering assembly in a system of 6 poles, triple wave winding, 21, 24, and 27 slots, and 6 brushes;

FIG. 56 is a view explaining magnetic attracting forces of 2-pole and 4-pole motors;

FIG. 57 is a graph explaining the magnetic attracting forces of the 2-pole and 4-pole motors;

DESCRIPTION OF THE PREFERRED EMBODIMENTS

Embodiment 1

Figure 1:
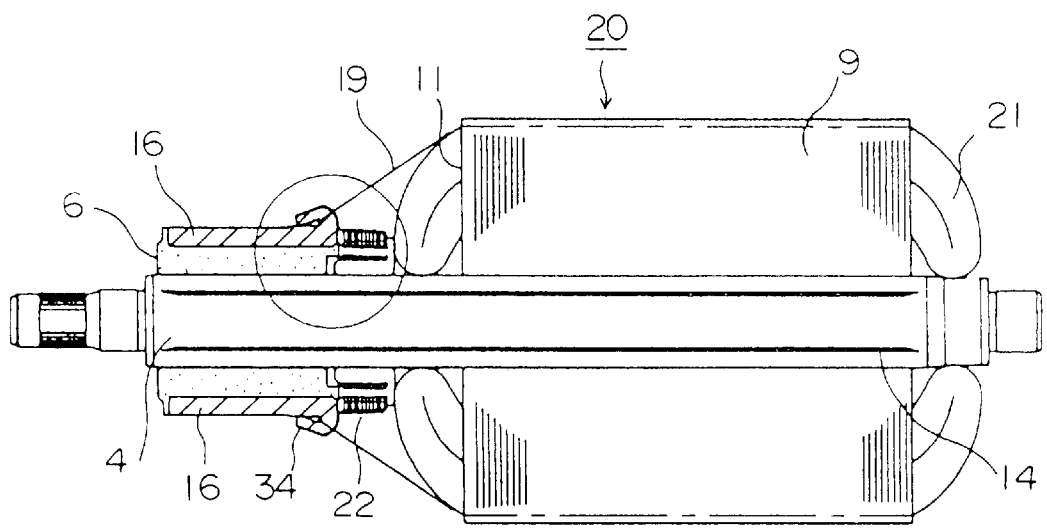
FIG. 1 is a sectional view of the interior of a motor for a power steering assembly according to an embodiment 1 of the present invention.

While embodiments of a motor for an electric power steering motor (hereinafter, abbreviated as "electric motor") of the present invention will be described below, in the following description, the same reference numerals as used in the conventional motor will be used to denote the same or equivalent components.

Figure 2:
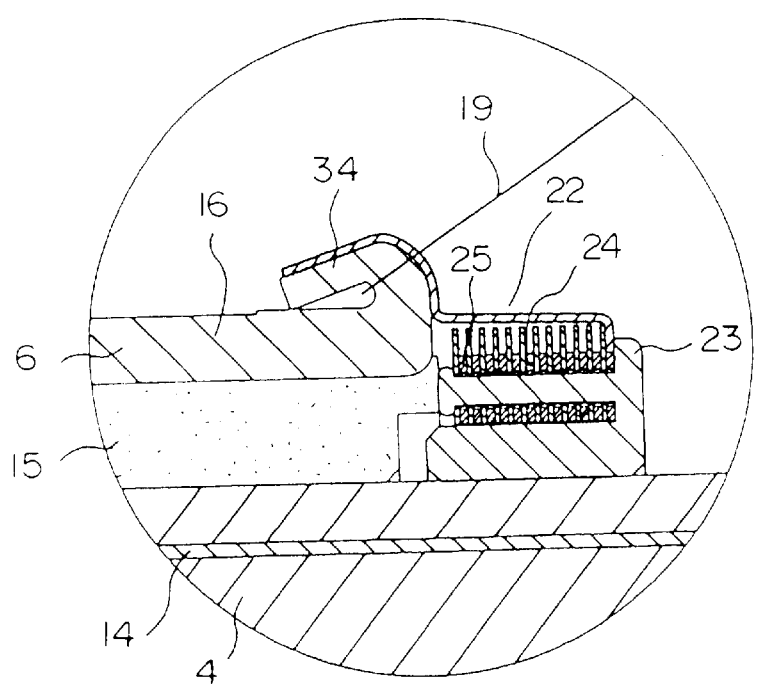
FIG. 2 is an enlarged view of the main portion of the motor for the power steering assembly shown in FIG. 1.

FIG. 1 is a side sectional view showing the internal structure of the electric motor of an embodiment 1 of the present invention, and FIG. 2 is an enlarged view of the main portion of the electric motor shown in FIG. 1. The electric motor, which employs a system of 4 magnetic poles, 24 pieces of slots 11, double wave winding and 4 brushes, includes a cylindrical yoke 1, 4 pieces of permanent magnets 2, which are fixed in the yoke 1 in a circumferential direction at intervals and composed of ferrite, a shaft 4 rotatably disposed in the yoke 1 through a bearing 3, an armature 20 fixed to the shaft 4, a commutator 6, which includes a plurality of segments 16 fixed to an end of the shaft 4, 4 pieces of bushes 8, which are abutted against the surface of the commutator 6 through the elastic force of a spring and disposed at equal intervals, and an equalizer assembly 22 fixed to the shaft 4 between the armature 20 and the commutator 6. Note that, the yoke 1, the permanent magnets 2, the bearing 3, the spring 7 and the brush 8 are not shown in the figure.

The armature 20 includes a core 9, which has the 24 pieces of the slots 11 extending in an axial direction, and a winding 21 composed of a conductive wire 19 wound around the 24 pieces of the slots 11 by a double wave winding method.

FIG. 3($a$) is an unfolded front elevational view of the equalizer assembly 22 and FIG. 3($b$) is a side elevational view of the equalizer assembly 22 shown in FIG. 3($a$), wherein the equalizer assembly 22 is arranged such that each 12 pieces of terminals 24, which include copper sheets or the like as equalizer members, and insulating sheets 25 are alternately laminated on a base 23.

Figure 4:
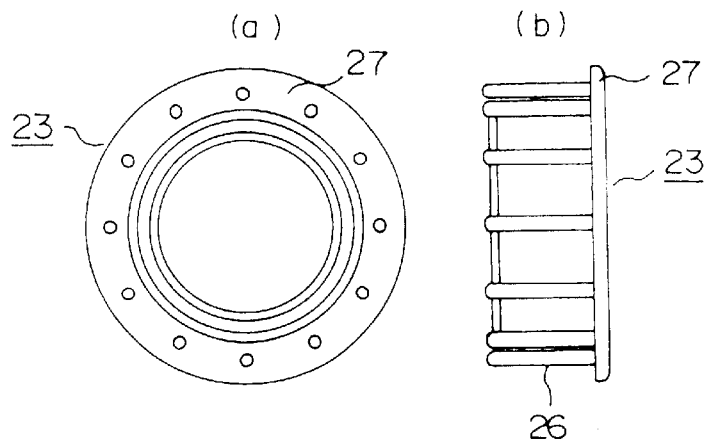
FIG. 4(*a*) is a front elevational view of the base of the equalizer assembly shown in FIG. 1, and FIG. 4(*b*) is a side elevational view of the base of the equalizer assembly shown in FIG. 4(*a*)

FIGS. 4($a$) and 4($b$) are front and side elevational views of the base 23, wherein 12 pieces of pins 26 stand on an annular base main body 27 along a circumferential direction at equal intervals.

Figure 5:
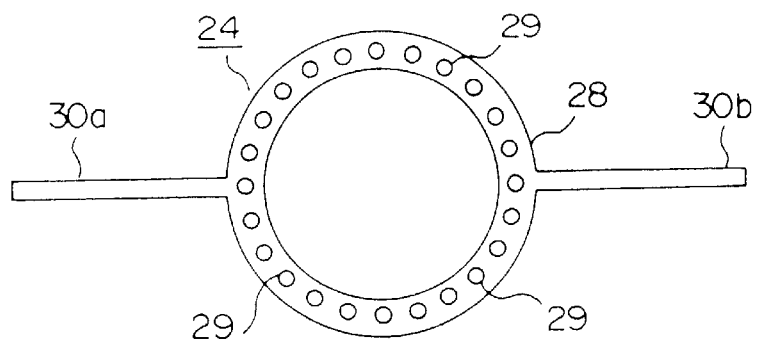
FIG. 5 is a front elevational view of a terminal of the equalizer assembly.

FIG. 5 is a front elevational view of the terminal 24 as the equalizer member, wherein holes 29 are defined through an annular terminal main body 28 along a circumferential direction at 24 positions at equal intervals. Further, the terminal main body 28 is provided with voltage equalizing line sections 30$a$ and 30$b$ which face each other and extend in an external direction.

Figure 6:
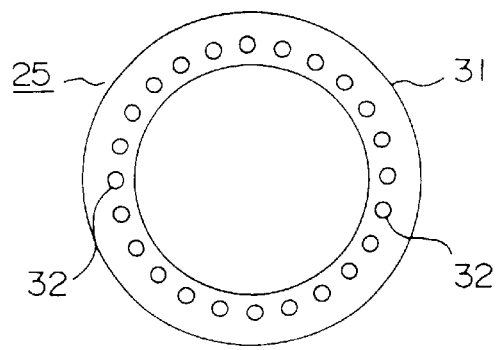
FIG. 6 is a front elevational view of an insulating sheet of the equalizer assembly shown in FIG. 1.

FIG. 6 is a front elevational view of the insulating sheet 25, wherein holes 32 are defined through an annular insulating sheet main body 31 at 24 positions at equal intervals along a circumferential direction.

Figure 7:
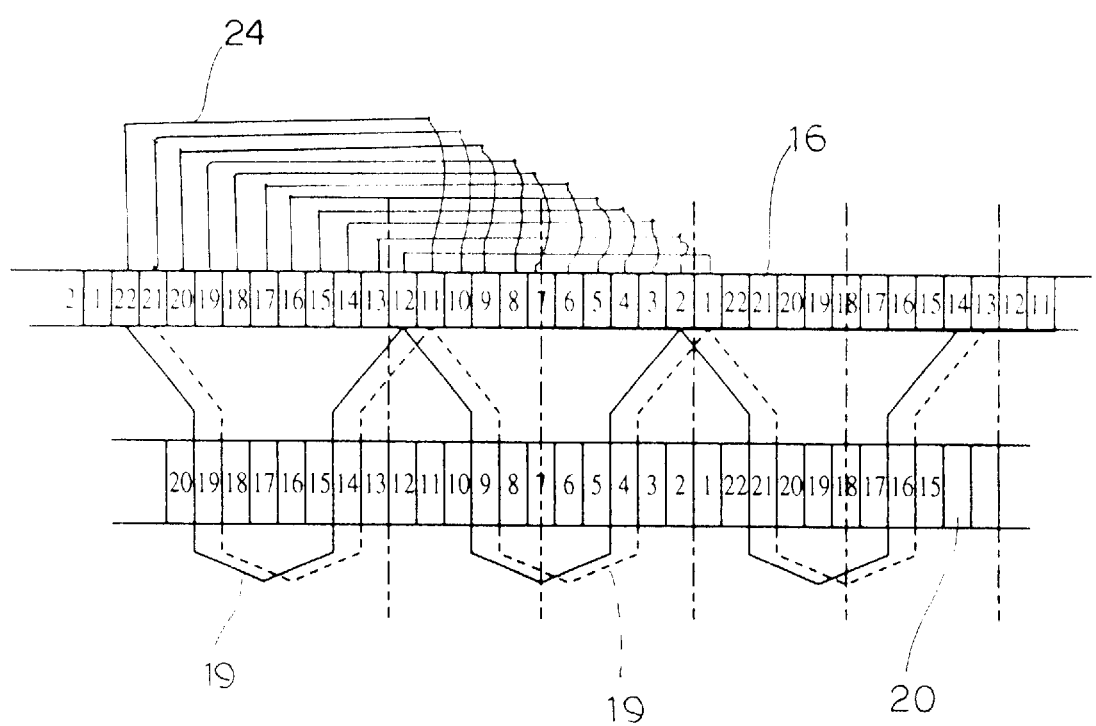
FIG. 7 is a winding view (not a winding finished view) in a case of 4 poles, double wave winding, and 22 slots.

Note that FIG. 7 shows a winding view (not a winding finished view) of a double wave winding method. The example of FIG. 7 is a case of an armature having 22 pieces of the slots, the conductive wire 19 shown by a solid line and the conductive wire 19 shown by a broken line are wounded by a double wave winding method, whereby two winding circuits, that is, a winding circuit shown by the solid line a winding circuit shown by the broken line are formed.

In the above motor, the equalizer assembly 22 is assembled by alternately laminating each 12 pieces of the terminals 24 and the insulating sheets 25 on the base 23. At this time, the terminals 24 are rotated at every 15° and the pins 26 of the base 23 are passed through the holes 29 of the terminals 24, thereby fixing the terminals 24 to the base 23. Further, the pins 26 of the base 23 are passed through the holes 32 of the insulating sheets 25, thereby fixing the insulating sheets 25 to the base 23. Thereafter, the extreme ends of the pins 26 are caulked to thereby produce the integrally assembled equalizer assembly 22.

Thereafter, the equalizer assembly 22 and the commutator 6 are fitted to the shaft 4 in this order. A projection 14, which extends in an axial direction, is formed on the shaft 4 to determine a rotating direction of the shaft 4, and the base 23 and a commutator main body 15, which include a phenol resin, are locked to the projection 14 by being elastically deformed.

Figure 9:
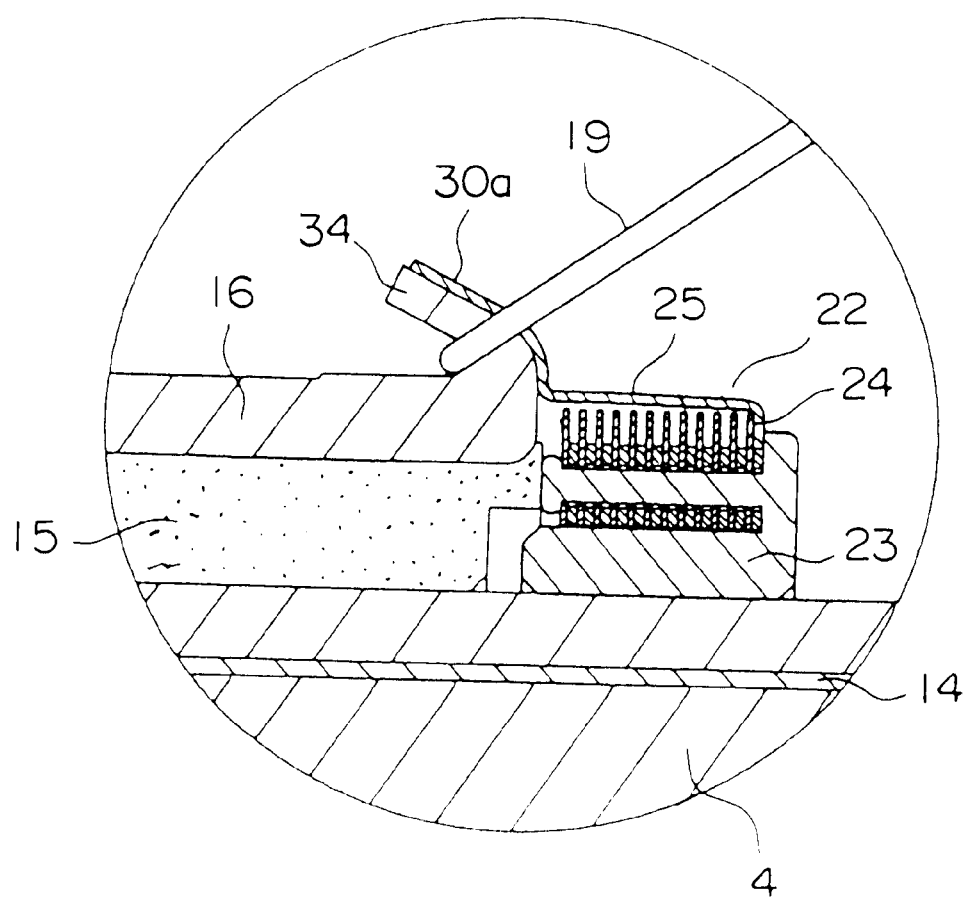
FIG. 9 is an enlarged view of the main portion of the motor for the power steering assembly shown in FIG. 1.

Next, the voltage equalizing line sections 30a and 30b are bent so that they are disposed along hooks 34 and the winding 21 is formed by winding the conductive wire 19 around the core 9 by the double wave winding method, whereby the armature 20 is finished. At this time, as shown in FIG. 9, the conductive wire 19 is locked on one surfaces of the hooks 34 of the segments 16 and the voltage equalizing line sections 30a and 30b are abutted against the other surfaces of the hooks 34. Thereafter, the conductive wire 19 and the voltage equalizing line sections 30a and 30b are electrically connected to the hooks 34 at 24 positions by fusing at the same time.

Figure 10:
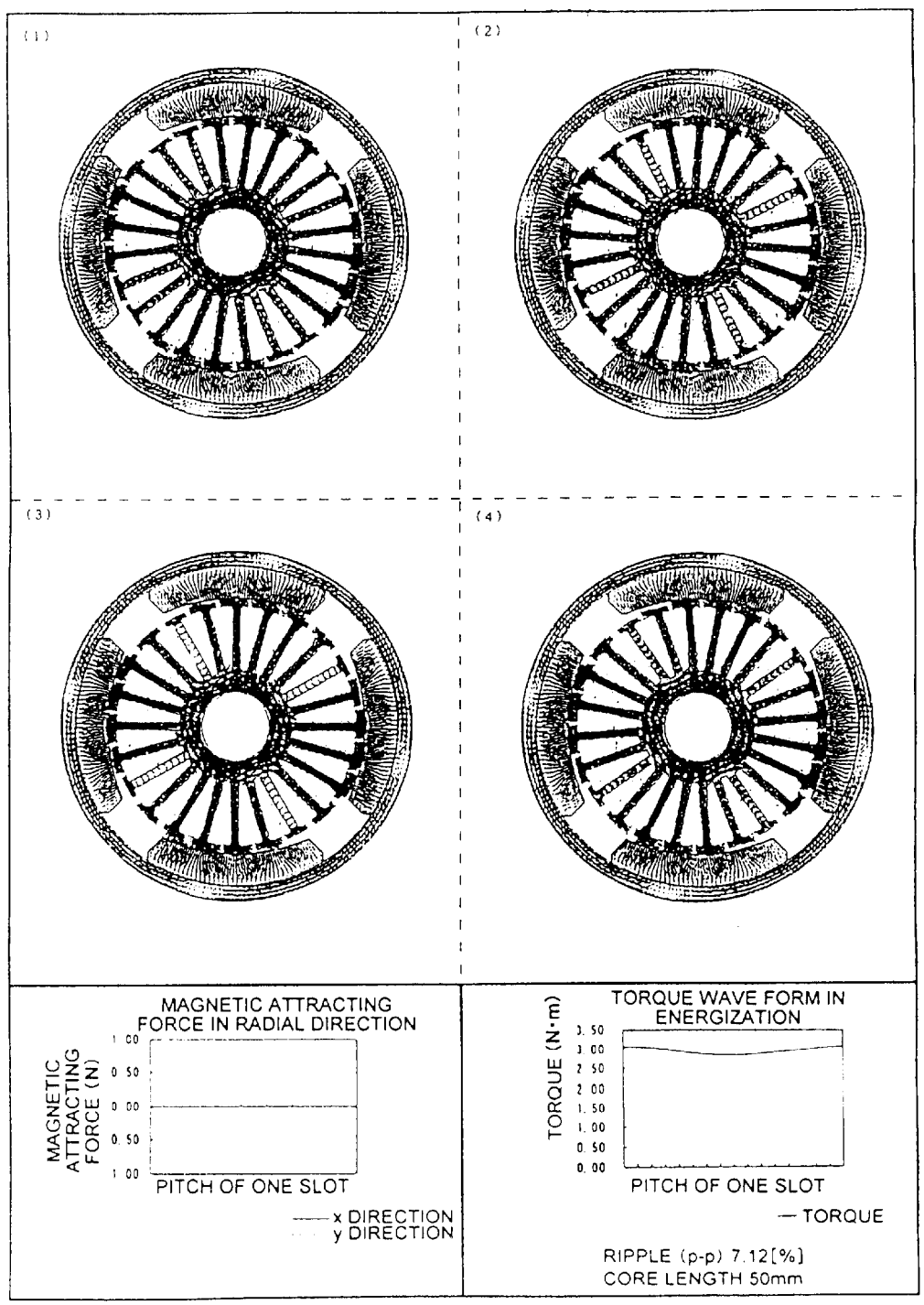
FIG. 10 is a view explaining an electromagnetic attracting force acting on an armature in a case of 4 poles, double wave winding, 4 brushes, and 24 slots.

The inventors of the present invention determined a magnetic attracting force, which acted on the armature 20 of the above electric motor employing the system of 4 magnetic poles, 24 pieces of slots 11, double wave winding and 4 brushes, and a torque ripple by a field analysis, and FIG. 10 is a view showing the thus determined magnetic attracting force and the torque ripple. It can be found that in the armature 5 shown previously in FIG. 61, which employs the system of the 4 poles, superimposed winding, 4 brushes and 21 slots, since the magnetic attracting force acting on the armature 5 varies in the circumferential direction, the rotational oscillation is liable to be generated in the armature 5 and operation noise is liable to be caused accordingly, whereas, in the double-wave-wound armature 20 having the even number of slots, that is, the 24 slots, no magnetic attracting force acts on the armature 20, and thus no operation noise is caused by rotational oscillation.

Figure 11:
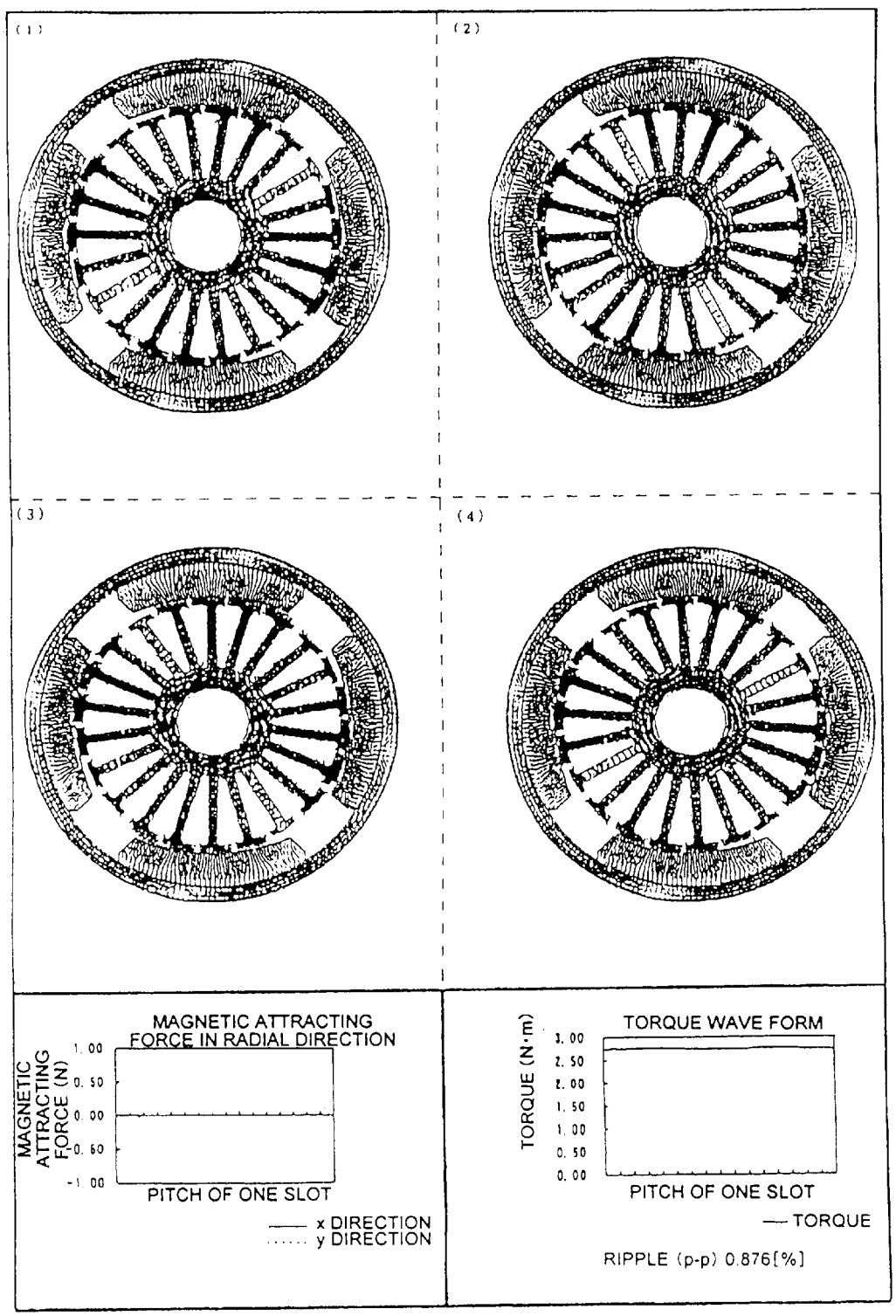
FIG. 11 is a view explaining an electromagnetic attracting force acting on an armature in the case of 4 poles, double wave winding, 4 brushes, and 22 slots.
Figure 12:
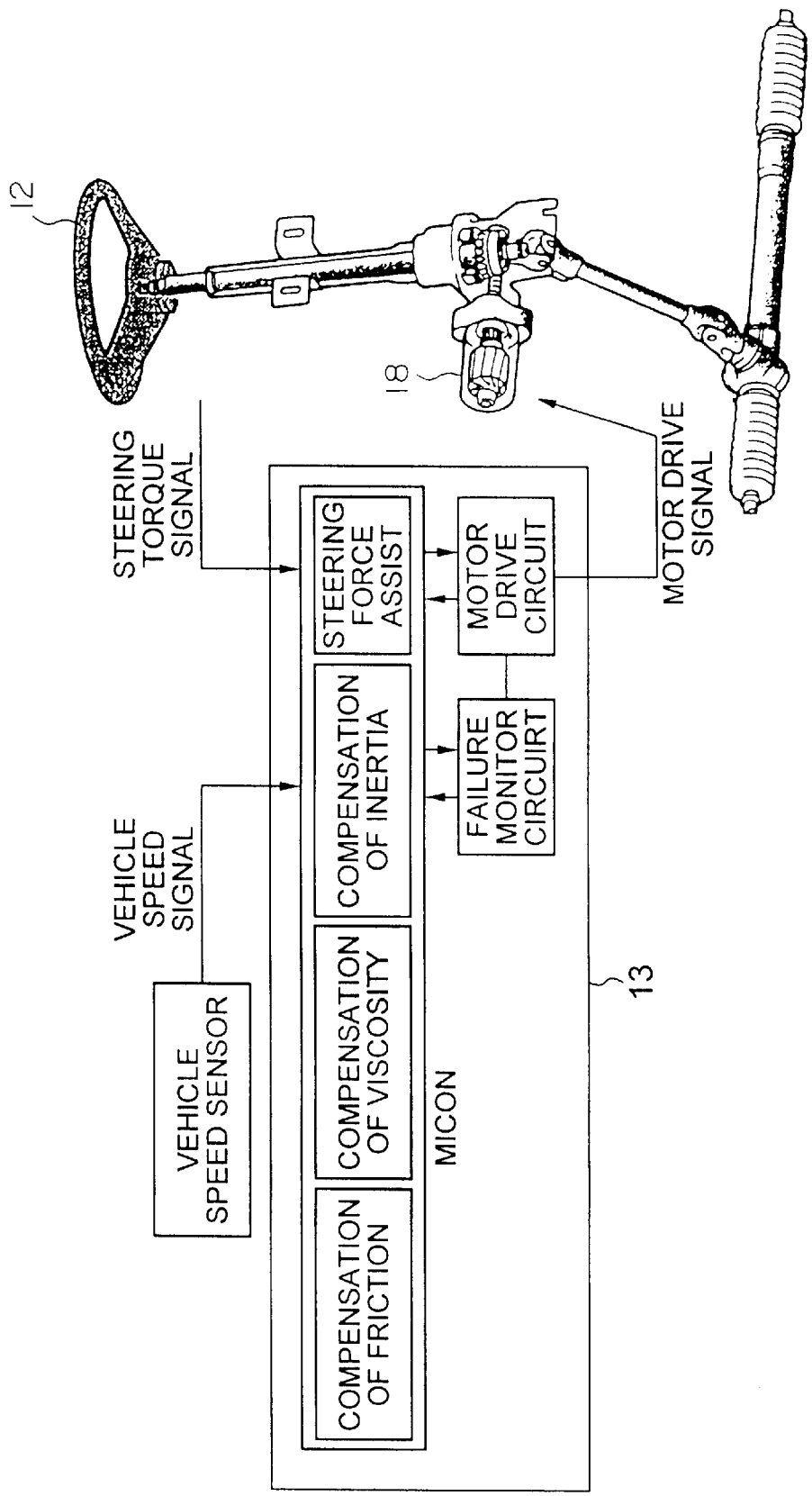
FIG. 12 is a block diagram of a control unit.

The inventors of the present invention determined a magnetic attracting force, which acted on a double-wave-wound armature having 4 poles and the even number of slots, that is, 22 slots, and a torque ripple. FIG. 11 shows the thus determined magnetic attracting force and the torque ripple.

As can be seen from the figure, it is found that no magnetic attracting force acts on the armature and no operation noise is caused by rotational oscillation also in the double-wave-wound armature having the 22 slots.

Figure 59:
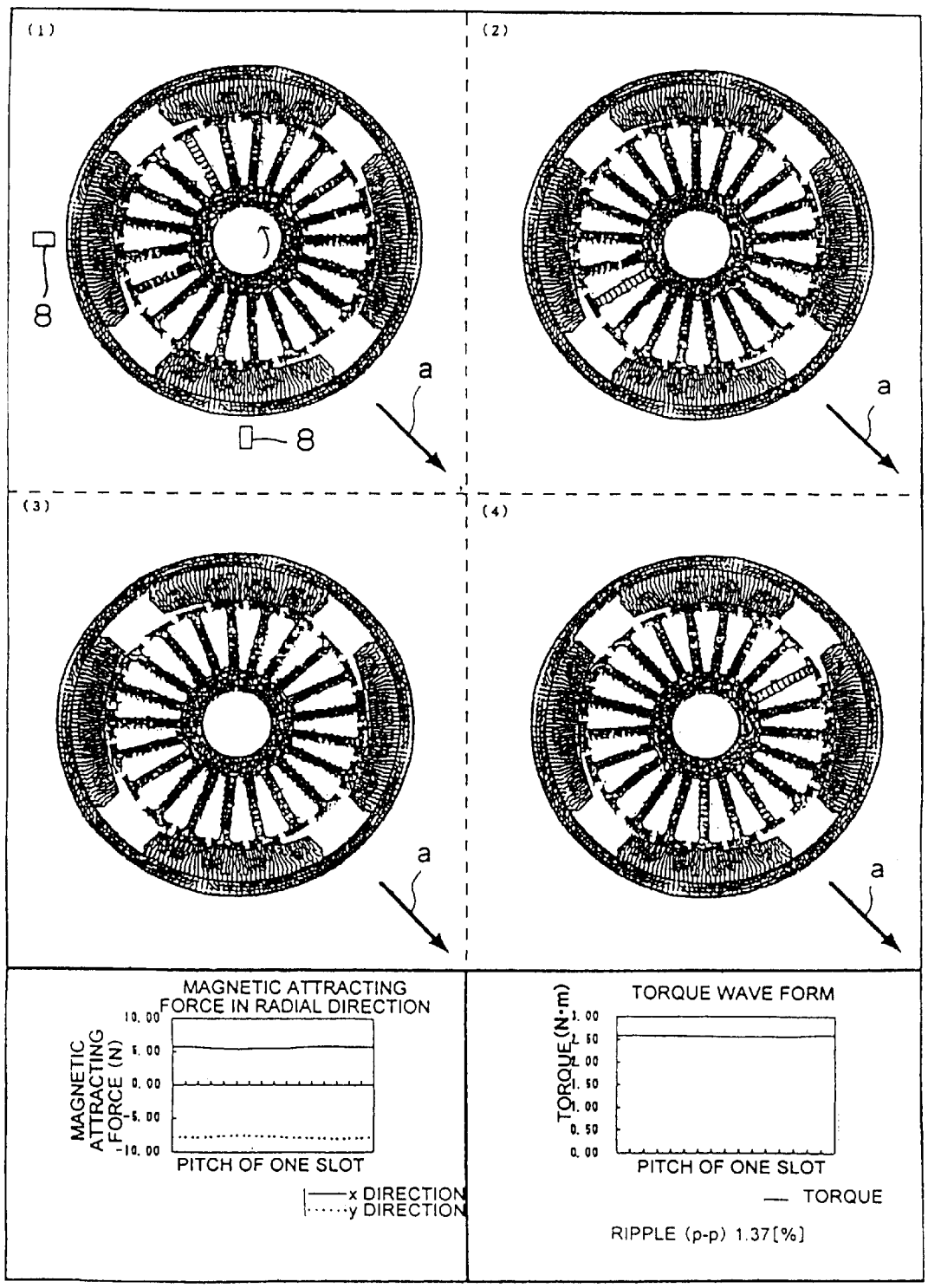
FIG. 59 is a graph explaining an electromagnetic attracting force and a torque ripple of a motor for an electric power steering assembly in a system of 4 poles, wave winding, 21 slots and 2 brushes.

Further, in the single-wave-wound armature previously shown in FIG. 59, a torque ripple (P—P), which is a ratio of a value of a difference between the high position and low position of a torque waveform to a torque value is 1.37%, whereas, in the double-wave-wound armature having the 22 slots, the torque ripple (P—P) is 0,876% which is smaller than that of the single-wave-wound armature. As a result, a torque ripple of an electric motor 18, which is driven by PWM (pulse with modulation in response to a motor drive signal from a control unit 13 is reduced, whereby steering feeling of a driver placing hands on a steering wheel is improved as compared with that of the electric motor employing the single wave winding.

Figure 13:
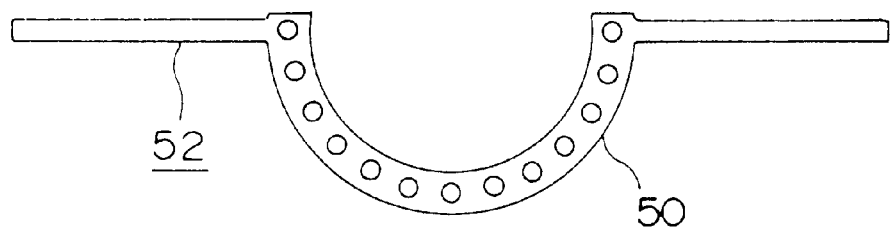
FIG. 13 is a front elevational view showing another example of the terminal.
Figure 14:
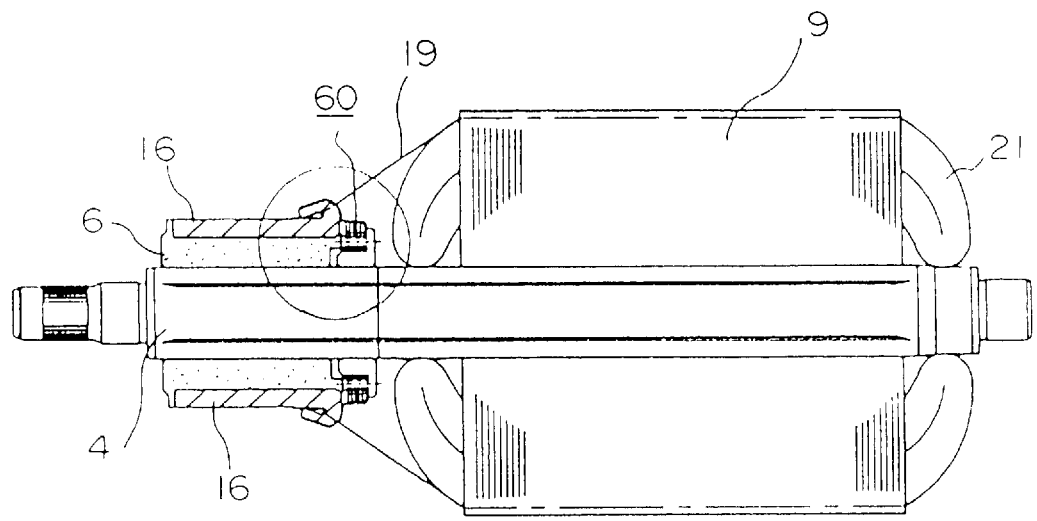
FIG. 14 is a side elevational view showing another example of the armature.
Figure 15:
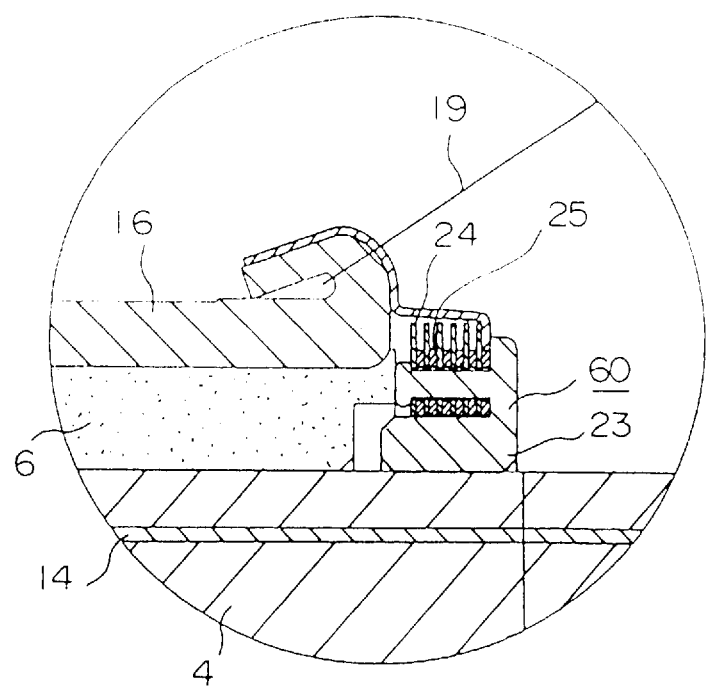
FIG. 15 is an enlarged view of the armature shown in FIG. 14.

It should be noted that while the annular terminal main body 28 is used in the equalizer assembly 22 arranged as described above, the terminal main body 50 of a terminal 52 may be formed in an arc shape as shown in FIG. 13 to save an amount of copper used as the material thereof.

Further, each 6 pieces of the terminals 24 and the insulating sheets 25 of an equalizer assembly 60 may be alternately laminated on the base 23 and the terminals 24 may be electrically connected to the hooks 34 alternately or may be electrically connected thereto using the terminals 24 in every third place.

It should be noted that while terminals as many as possible are more effective to prevent the generation of circulating currents running through brushes due to differences in induced voltage between circuits, the number of the terminals may be reduced in consideration of the processability of the equalizer assembly and its cost.

Figure 16:
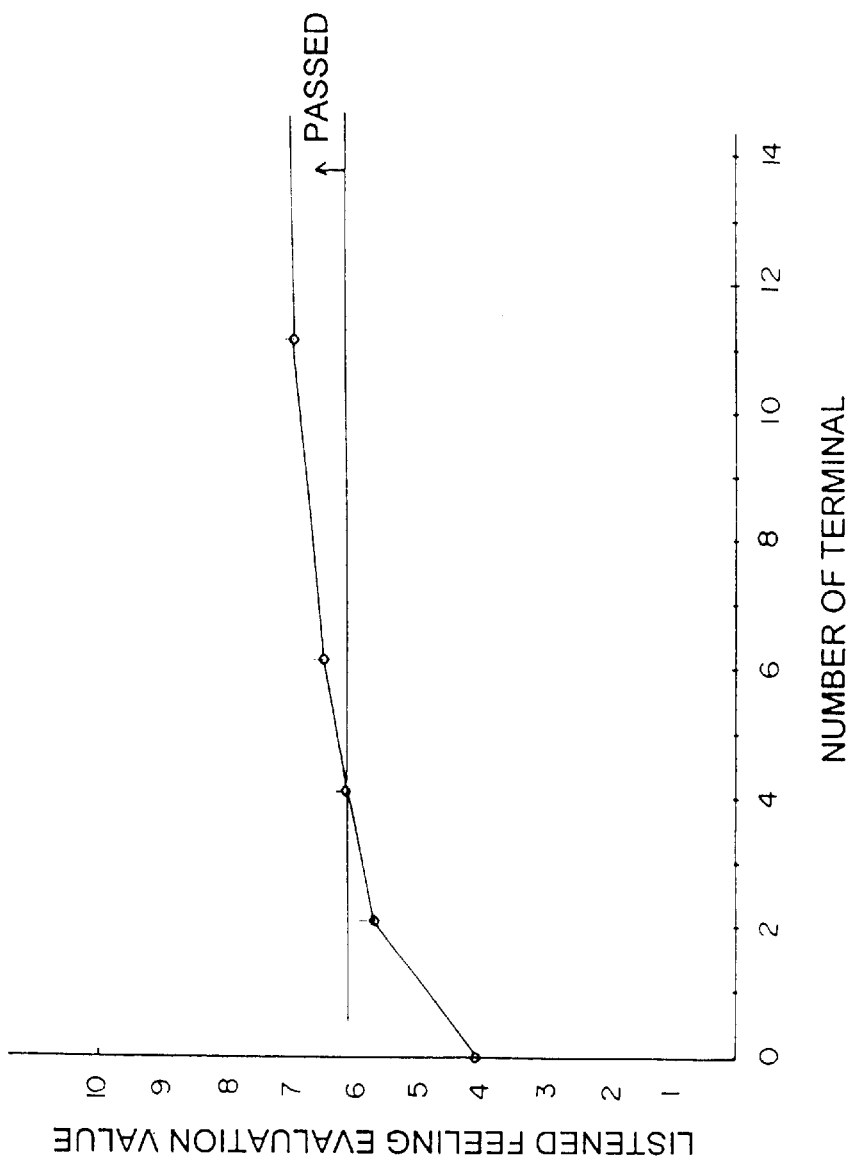
FIG. 16 is a graph showing a relationship between the number of terminals and a listened feeling evaluating point.

Incidentally, it was found that operation noise is reduced when the number of the terminals satisfies the following formula.

$$Ns/(n \times 2) \leq K \leq Ns$$

where, k represents the number of terminals, Ns represents the number of slots of a core, and n represent a maximum value of the striding number of segments of brushes. That is, FIG. 16 is an evaluation table when Ns=22 and n=3, and when 6 points or more are obtained out of 10 points in evaluation, it is successful. The above formula satisfies the standard of the evaluation point system.

Further, an enameled round wire is used as the conductive wire 19 of the winding 21 in the electric motor arranged as described above so that the wire can be wound by a machine to permit mass production and to reduce a manufacturing cost. However, even the machine-wound wire cannot be wound in a perfectly aligned state and there is a possibility that the dispersion of the resistances and the amount of inductance of the winding is increased between respective circuits. However, since the circulating current, which flows to the brushes due to the difference between the electromotive forces induced between the respective circuits, is prevented by the provision of the equalizer assembly 22, no drawback is caused by the dispersion of the resistances and the amounts of inductance between the respective circuits of the winding.

Further, the electric motor arranged as described above utilizes the field permanent magnets 2 composed of the ferrite to reduce the torque ripple which is largely related to a steering property. When a field is made by winding a wire, a magnetic flux density is ordinarily increased as compared with a field made by a permanent magnet, and when a slot of a core is located at a position where it faces a magnetic pole and when a teeth of the core is located at the position, a space magnetic flux density is greatly varied depending upon a change of position of the armature in a rotating direction, and thus the torque ripple is increased. Usually, an average space magnetic flux density is about 3 to 4000 gausses a field permanent magnet composed of the ferrite, whereas, in the field made by the wound wire, the average space magnetic flux density is 7 to 8000 gausses which is about twice that of the permanent magnet. Thus, when the wound wire system is employed, the torque ripple is increased and the magnetic attracting force is greatly changed at the teeth section of the core and electromagnetic noise also is increased. Further, when the field permanent magnet composed of the ferrite is used, it is possible to reduce a size of the electric motor, to improve workability in the assembly thereof and to decrease the cost thereof.

It is effective to use the field permanent magnet composed of ferrite as described above in the electric motor. However, since the field has a low magnetic flux density in this case, torque characteristics are secured by increasing the number of winding of the conductive wire of the armature. As a result, the field magnet is greatly influenced by the reaction force of the armature, whereby the magnetic center of the distribution of magnetic fluxes of a field magnetic pole is greatly dislocated in a rotating direction of the armature and in a direction opposite to the rotating direction. In an ordinary motor, the positions of brushes are dislocated in the rotating direction of an armature and in a direction opposite to the rotating direction from the geometric center of a magnetic pole to compensate the dislocation of the magnetic center, thereby securing a good distribution of magnetic fluxes. However, since the above electric motor rotates in both right and left directions, a good distribution of magnetic fluxes cannot be secured by compensating the dislocation of the magnetic center by shifting the positions of brushes in a rotating direction of the armature and in a direction opposite to the rotating direction.

Accordingly, in the electric motor, the equalizer assembly 22 is provided with the armature 20 to compensate deterioration of the distribution of the magnetic fluxes so that the voltages induced to the respective circuits of the winding are balanced as well as a good distribution of the magnetic fluxes is secured. As a result, the following particular effects (1) to (6) can be obtained.

Figure 17:
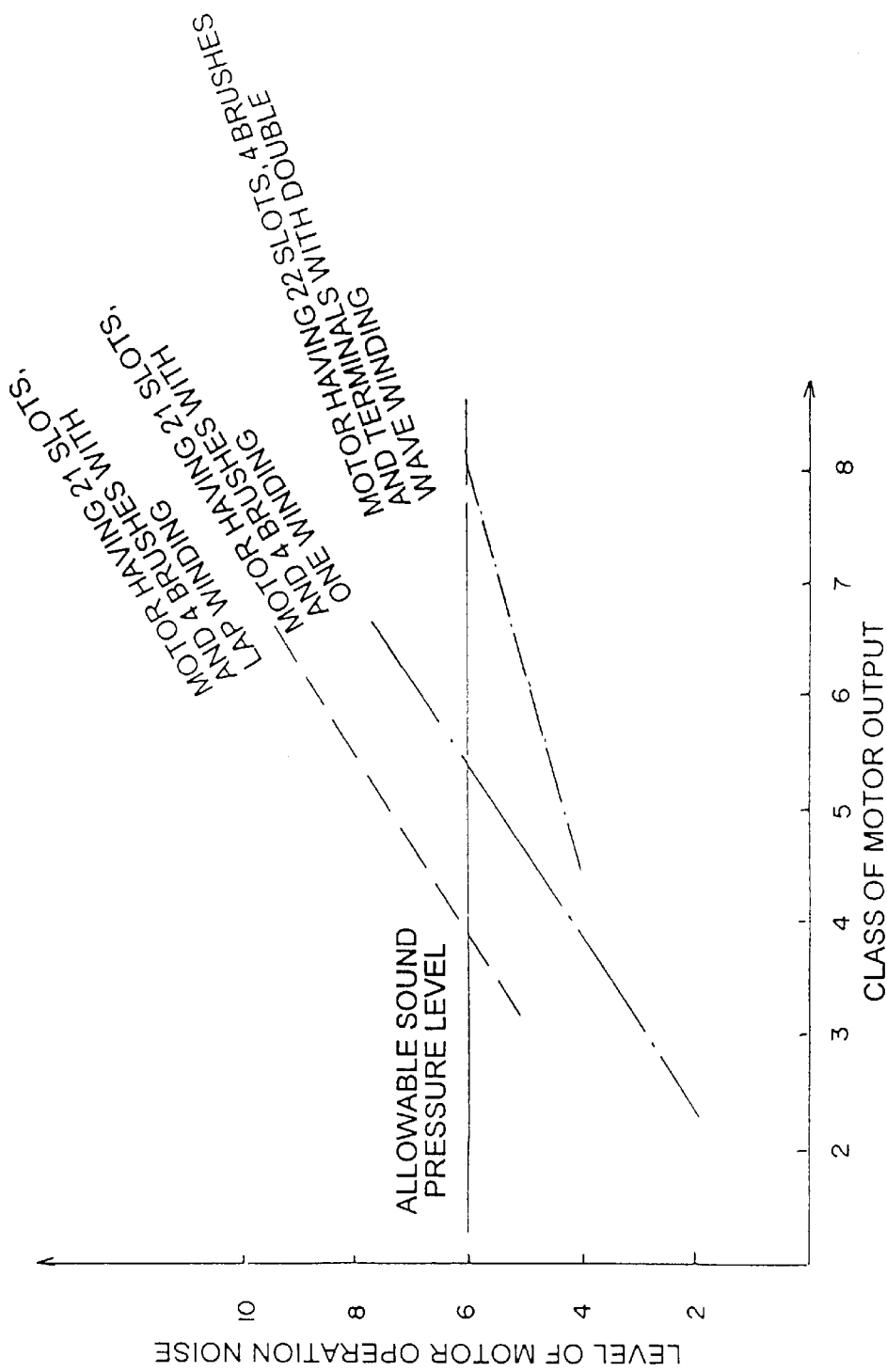
FIG. 17 is a graph showing a relationship between a motor output class and a motor operation noise in respective motors.
Figure 18:
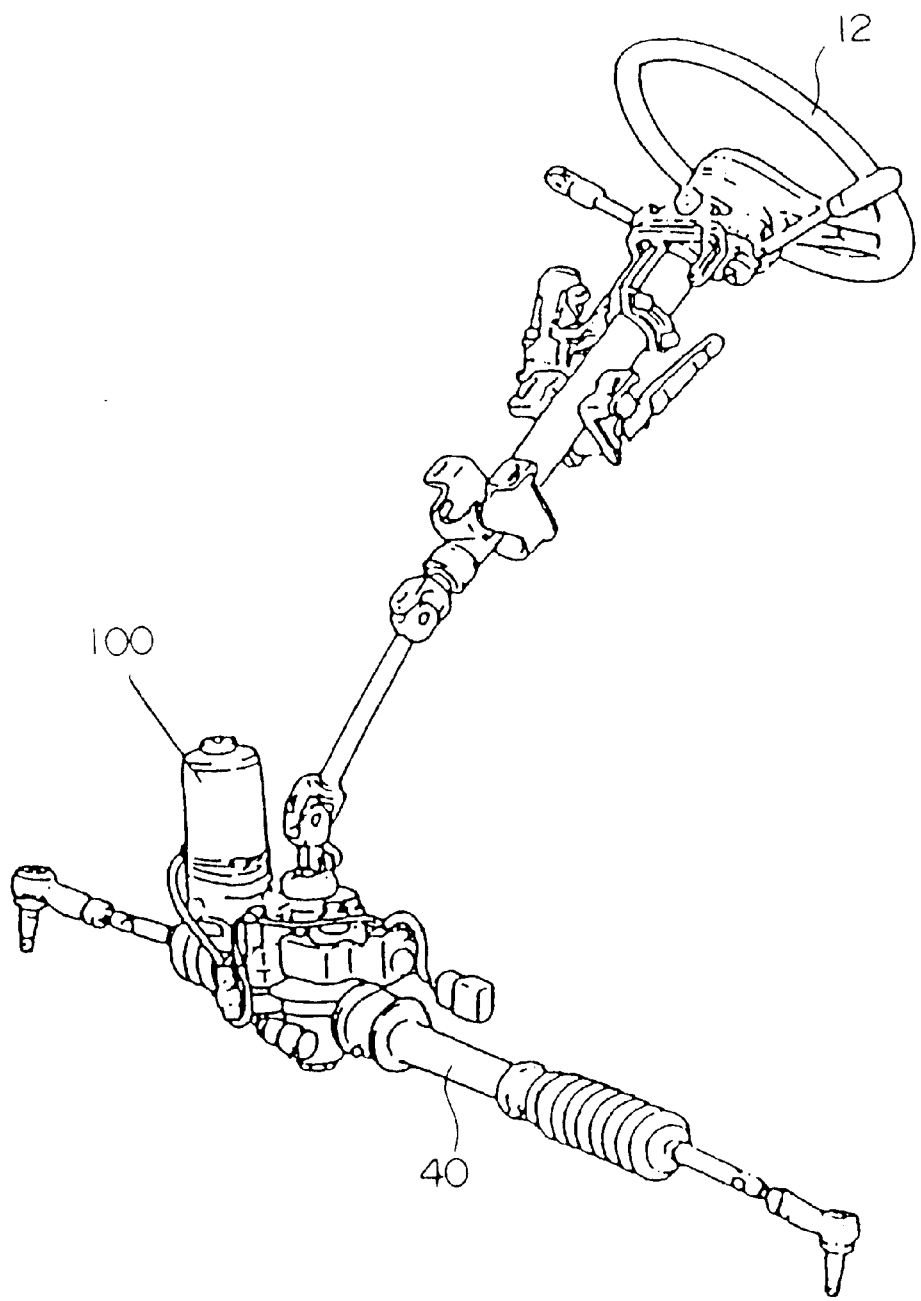
FIG. 18 is a perspective view showing how a rotary electric machine is mounted on a pinion.

(1) Since the operation noise of the electric motor is reduced as shown in FIG. 17, even if the electric motor is mounted on the column of a steering wheel, a driver does not feel unpleasant operation noise in steering operation. Since the electric motor can be mounted on the column located in a passenger compartment, the electric motor can be manufactured at a cost lower than that of the conventional electric motor 100 mounted on a rack 40 in an engine compartment as shown in, for example, FIG. 18. This is because that the electric motor mounted in the passenger compartment is very advantageous in the environmental resistance against heat and water.

(2) Since the double wave winding and 4-brush system is employed, the torque ripple is reduced, and even if the electric motor is driven by the PWM in response to a motor drive signal from the control unit 13, the oscillation of the electric motor generated when the electric motor is driven is not almost transmitted to the steering wheel 12, and thus the steering feeling of the driver is not deteriorated.

Further, since the torque ripple of the electric motor is reduced, a degree of freedom of design of the PWM drive system of the control unit 13 is increased so that responsiveness, and controllability in a minute current can be improved, and thus the steering feeling can be more improved.

Figure 19:
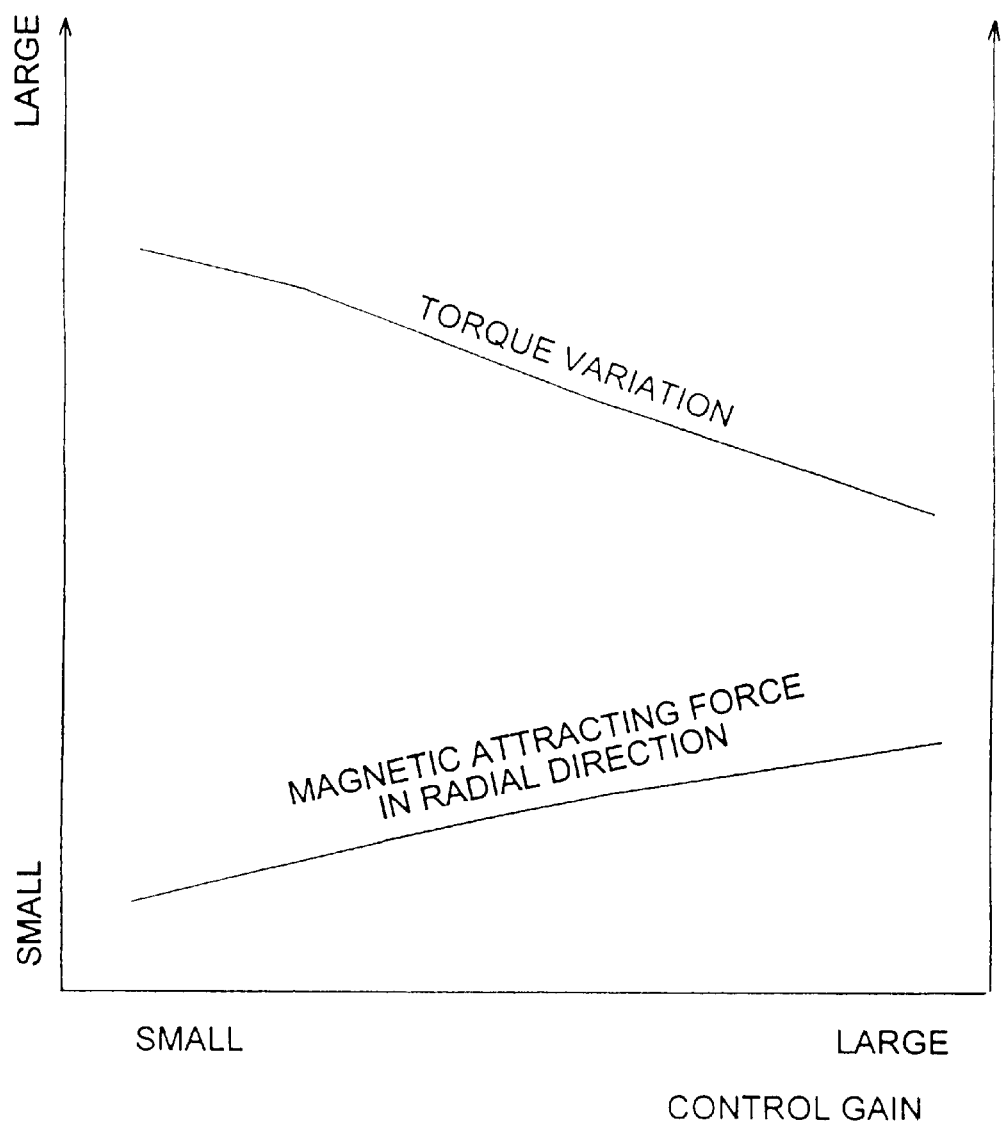
FIG. 19 is a graph showing a relationship among a control gain, a variation of torque and an electromagnetic attracting force in a radial direction.

Further, holding noise can be lowered (which is caused by oscillation of the electric motor resulting from a variation of torque due to a change of a current flowing to the armature 20 which is made by a fine change of a contact state between the brushes 8 and the segments 16 in a state that the steering wheel 12 is fixed at a certain position and which is oscillation noise generated in a minute change of backlash in a system in a state in which the electric motor is not driven). The noise due to fixed steering wheel is liable to be generated in the conventional single wave winding and 2-brush system because the torque ripple is large therein. However, when a control gain is increased to suppress the generation of the noise due to fixed steering wheel by the control unit 13, operation noise (magnetic attracting force in a radial direction) is increased while a variation of torque, which indicates a degree of the noise due to fixed steering wheel, is reduced, as shown in FIG. 19. Thus, it has been impossible to suppress both the noise due to fixed steering wheel and the operation noise. In contrast, in the electric motor employing the double wave winding and 4-brush system, the generation of both the noise due to fixed steering wheel and the operation noise can be suppressed.

(3) Since the double wave winding and 4-brush system is employed, a current density of the brushes 8 can be reduced, whereby an allowable energizing time of the electric motor can be increased. The electric motor is often used in a so-called "stationary steering" or "end locked state" in which the steering wheel 12 is cramped up to a maximum angle when a vehicle is driven to a garage or makes a U-turn. At this time, however, the armature of the electric motor is not almost rotated and generates only torque so that the electric motor is used in a restricted state. At this time, since a current density of the brushes 8, whose temperature is most largely increased, can be reduced, a usable time of the electric motor in the "stationary steering" or "end locked state" can be increased, whereby the convenience of the electric motor can be improved.

Further, the life of the brushes 8 can be increased, whereby the reliability and durability of the electric motor can be increased.

(4) Since the double wave winding and 4-brush system is employed, a cross sectional area of the conductor wire of the winding 21 can be reduced to one half that used in a single wave winding method when they have the same performance. As a result, the conductor wire can be easily deformed so as to be easily wound. Further, since a diameter of the conductor wire is reduced, a gap between the conductor wires is reduced in the slots 11 of the core 9. Thus, since a large space factor can be set, a size of the electric motor can be reduced. Accordingly, the inertia moment and loss torque of the armature 20, which are important factors in a steering property, can be reduced.

(5) Since the electromotive forces induced between the respective circuits of the winding are well balanced, the torque ripple is more reduced and the torque ripple transmitted to the steering wheel 12 is more reduced, and thus a steering feeling of the driver can be more improved.

(6) Since an excellent rectifying action can be obtained, it is advantageous to radio noise and the like because sparks are less generated, in addition to such effects that a life of the brushes 8 is increased, that an increase in temperature of the brushes 8 can be suppressed, and that rectifying noise (spark noise) of the brushes 8 can be reduced. In particular, even if the electric motor cannot help being mounted on the column of the steering wheel 12 at a position near to the power supply circuit and the like of a radio receiving set, the electric motor less influences radio noise and the like.

Further, since sparks are less generated, a load on the spring 7 for pressing the brushes 8 against the commutator 6 can be reduced, an amount of loss torque caused by pressing the brushes 8 can be reduced, and an amount of friction heat generated by pressing the brushes 8 can be reduced. Therefore, even if the double wave winding and 4-brush system is employed, it is possible to make an amount of loss torque as small as that in the single wave winding and 2-brush system.

Note that while the motor for an electric power steering assembly employing the 4-pole, 24- and 22-slots, and double wave winding method has been described in the above embodiment, the number of slots is not limited thereto and a noise reducing effect can be obtained so long as the even number of slots, by which a magnetic attracting force is not generated in a radial direction with respect to the armature, are employed.

In addition to the above-mentioned, the torque ripple can be reduced when the number of the slots is a number which is not an integer multiple of the number of pairs of the poles.

Figure 20:
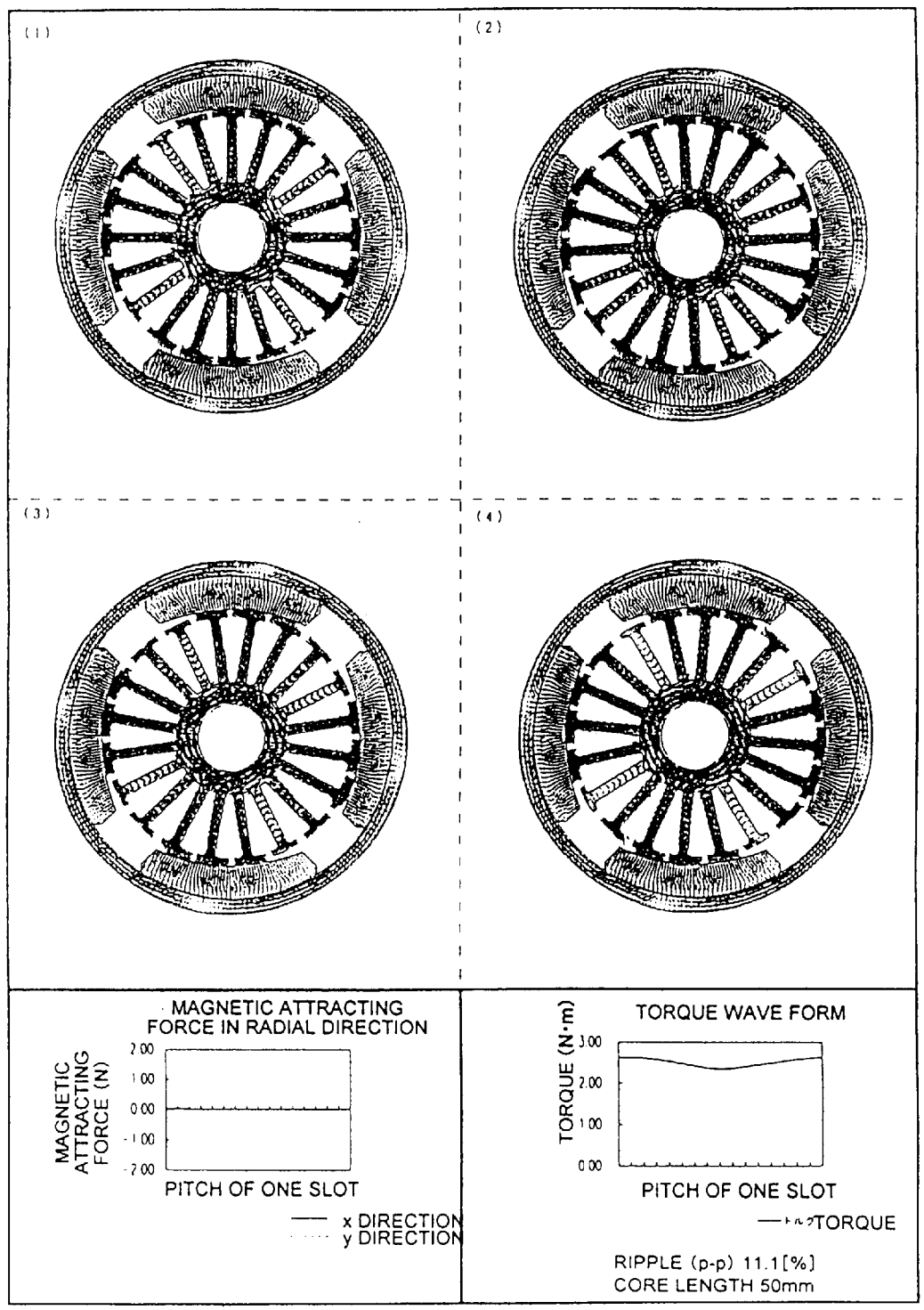
FIG. 20 is a view explaining an electromagnetic attracting force acting on an armature in a system of 4 poles, double wave winding, 20 slots, and 4 brushes.
Figure 21:
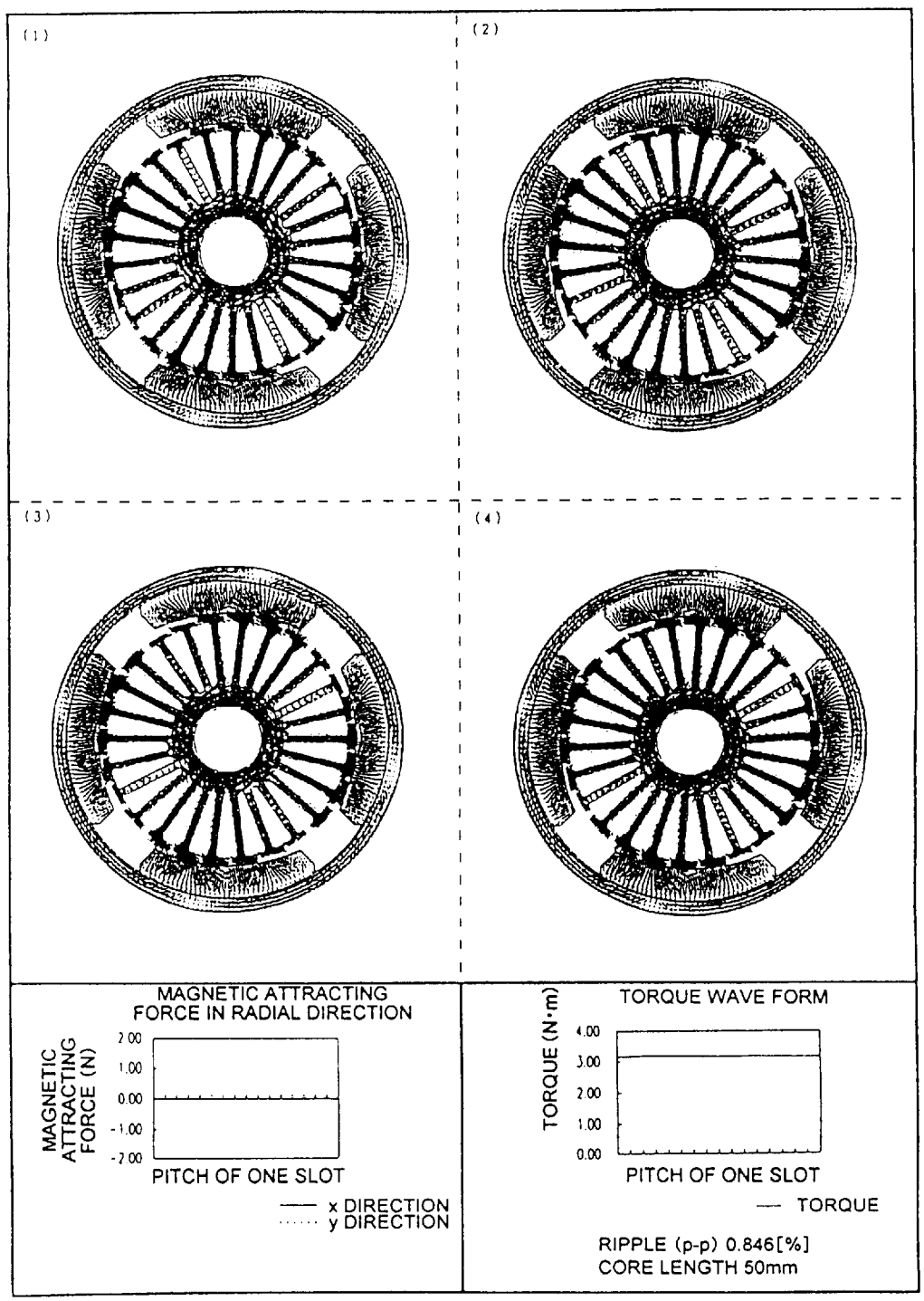
FIG. 21 is a view explaining an electromagnetic attracting force acting on an armature in a system of 4 poles, double wave winding, 26 slots, and 4 brushes.
Figure 22:
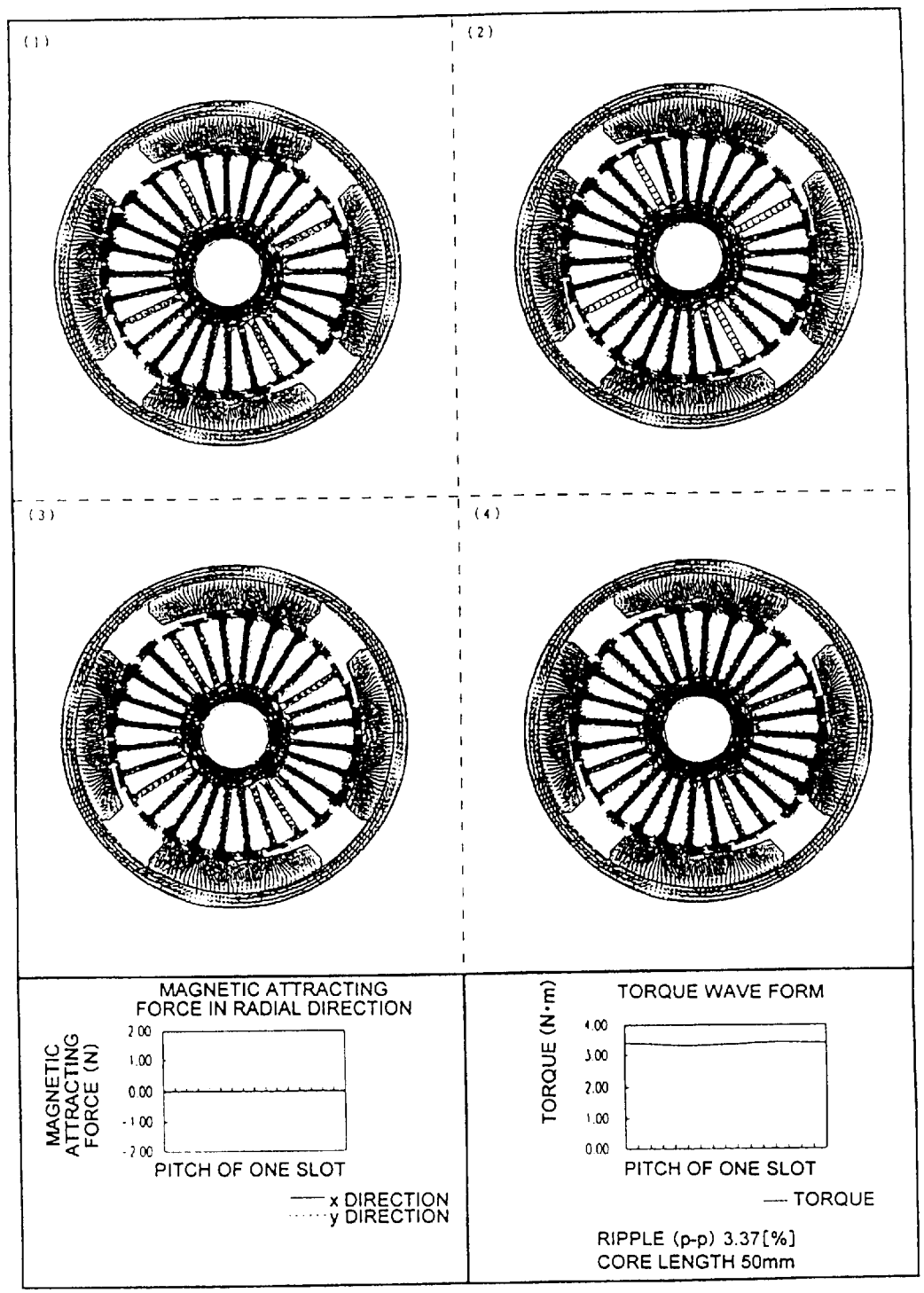
FIG. 22 is a view explaining an electromagnetic attracting force acting on an armature in a system of 4 poles, double wave winding, 28 slots, and 4 brushes.

FIGS. 20 to 22 show a magnetic attracting force acting on an armature and torque in cases in which double wave winding, and 4 poles/20 slots, 4 poles/26 slots, and 4 poles/28 slots are employed. It can be found that no magnetic attracting force is acts in a radial direction in any of the examples. FIG. 23 summarizes the results of the above examples, from which it can be found that when the number of the slots is selected to an even number or an integer multiple of the number of pairs of the poles, no magnetic attracting force is generated in the radial direction as well as unless the number of the slots is not an integer multiple of poles, the torque ripple also can be reduced.

Figure 8:
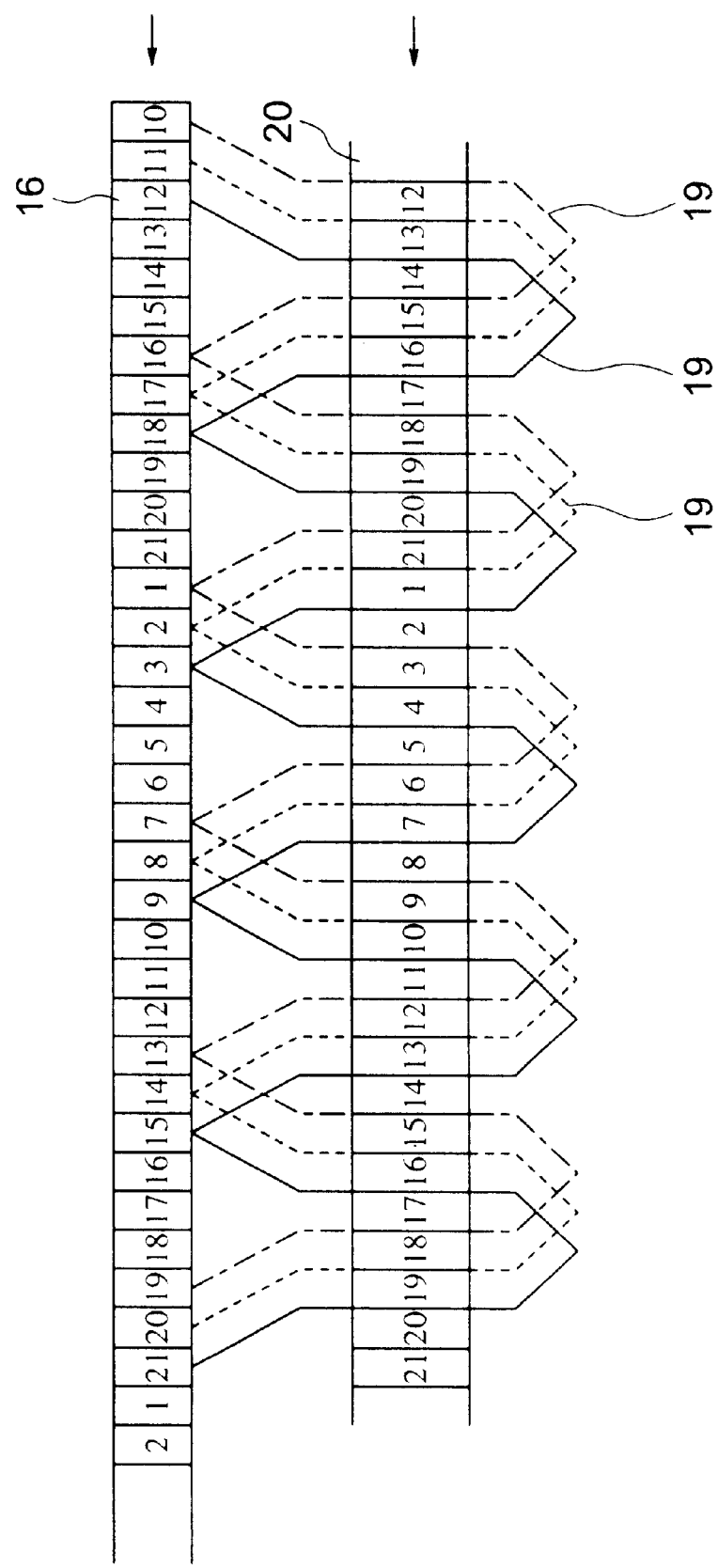
FIG. 8 is a winding view (not a winding finished view) in a case of 6 poles, triple wave winding, and 21 slots.
Figure 24:
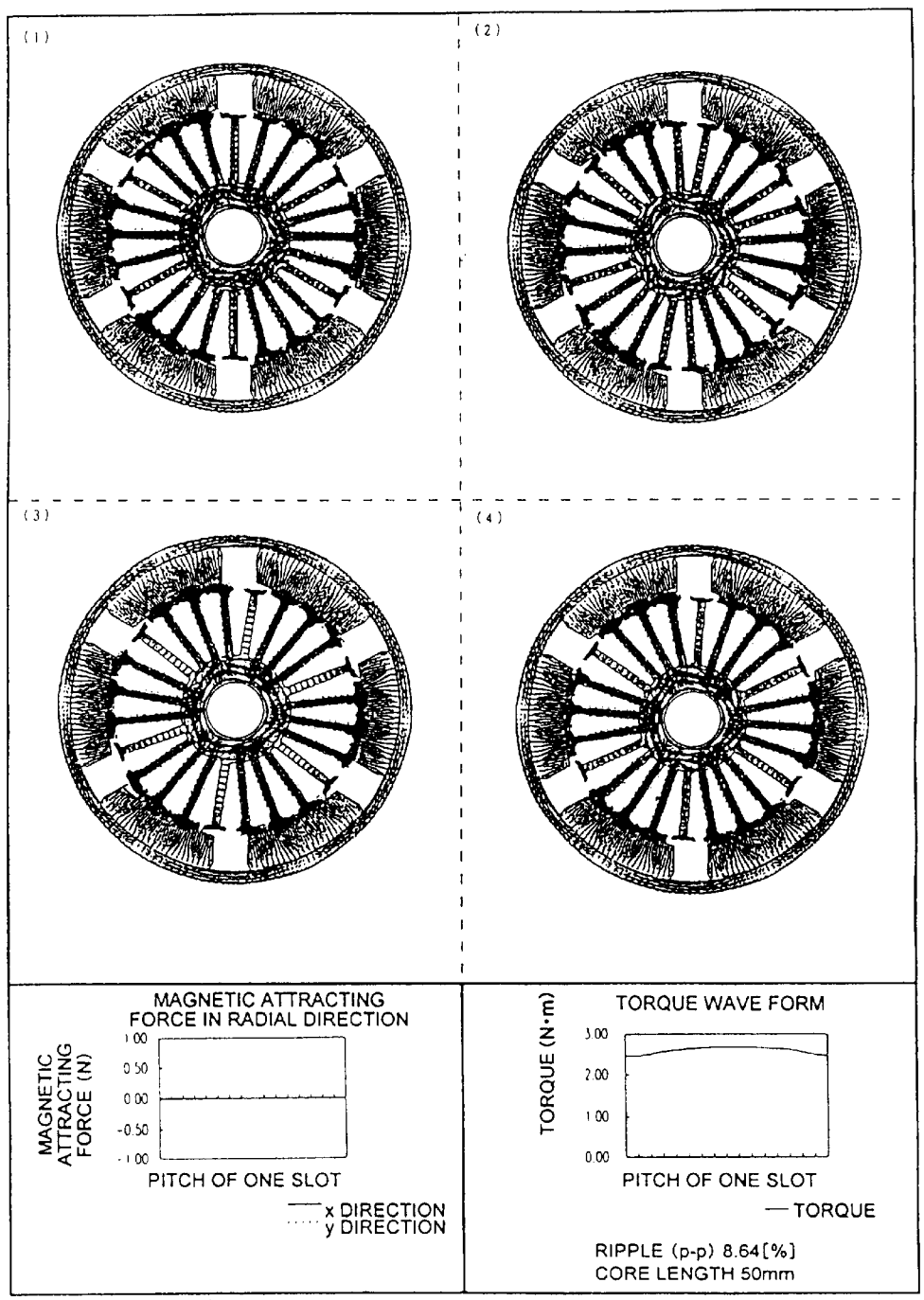
FIG. 24 is a view showing a relationship between a torque ripple and an electromagnetic attracting force of a motor for an electric power steering assembly in a system of 6 poles, triple wave winding, 24 slots, and 4 brushes.
Figure 25:
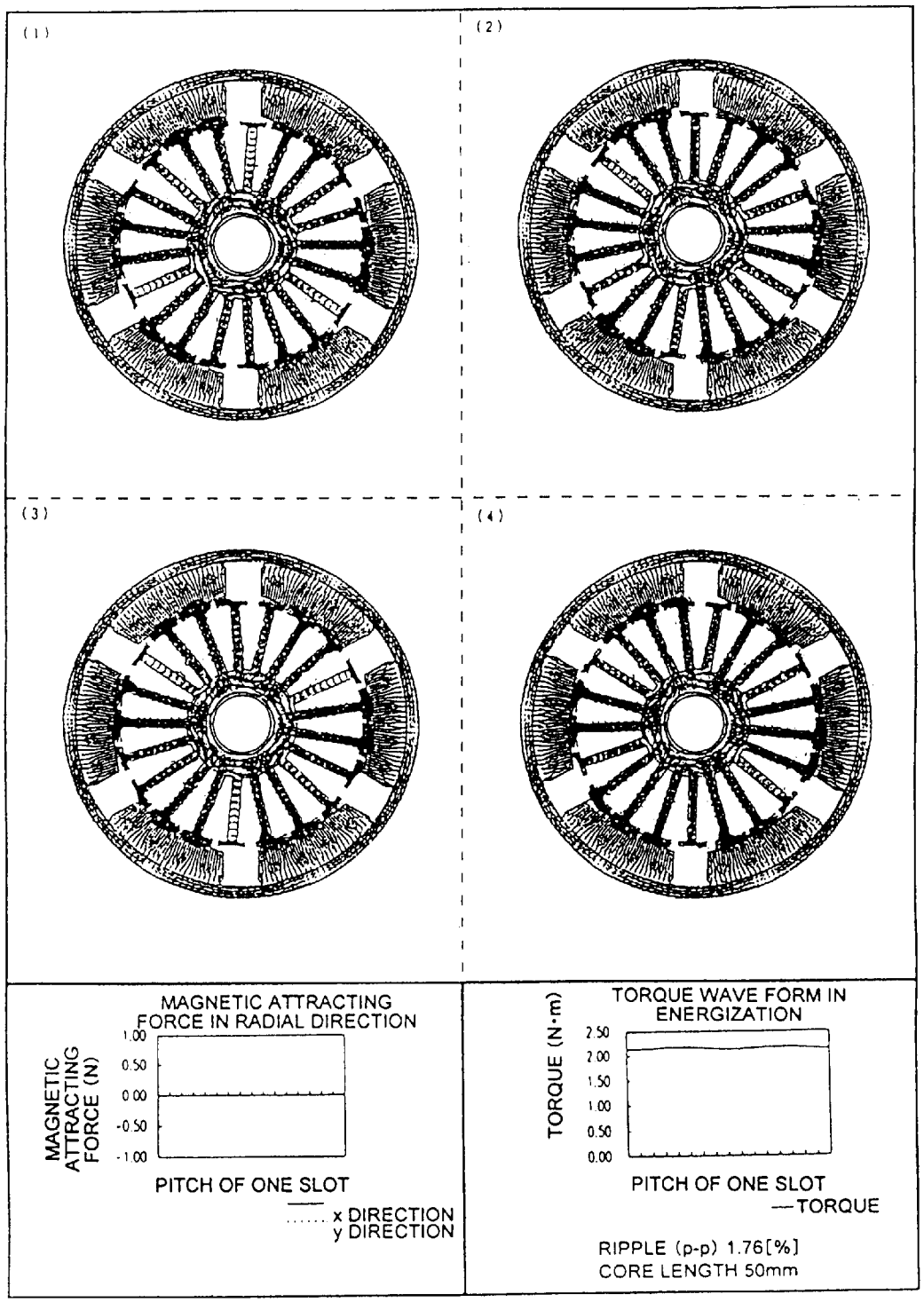
FIG. 25 is a view explaining a relationship between an electromagnetic attracting force and a torque ripple of a motor for an electric power steering assembly in a system of 6 poles, triple wave winding, 21 slots, and 6 brushes.
Figure 26:
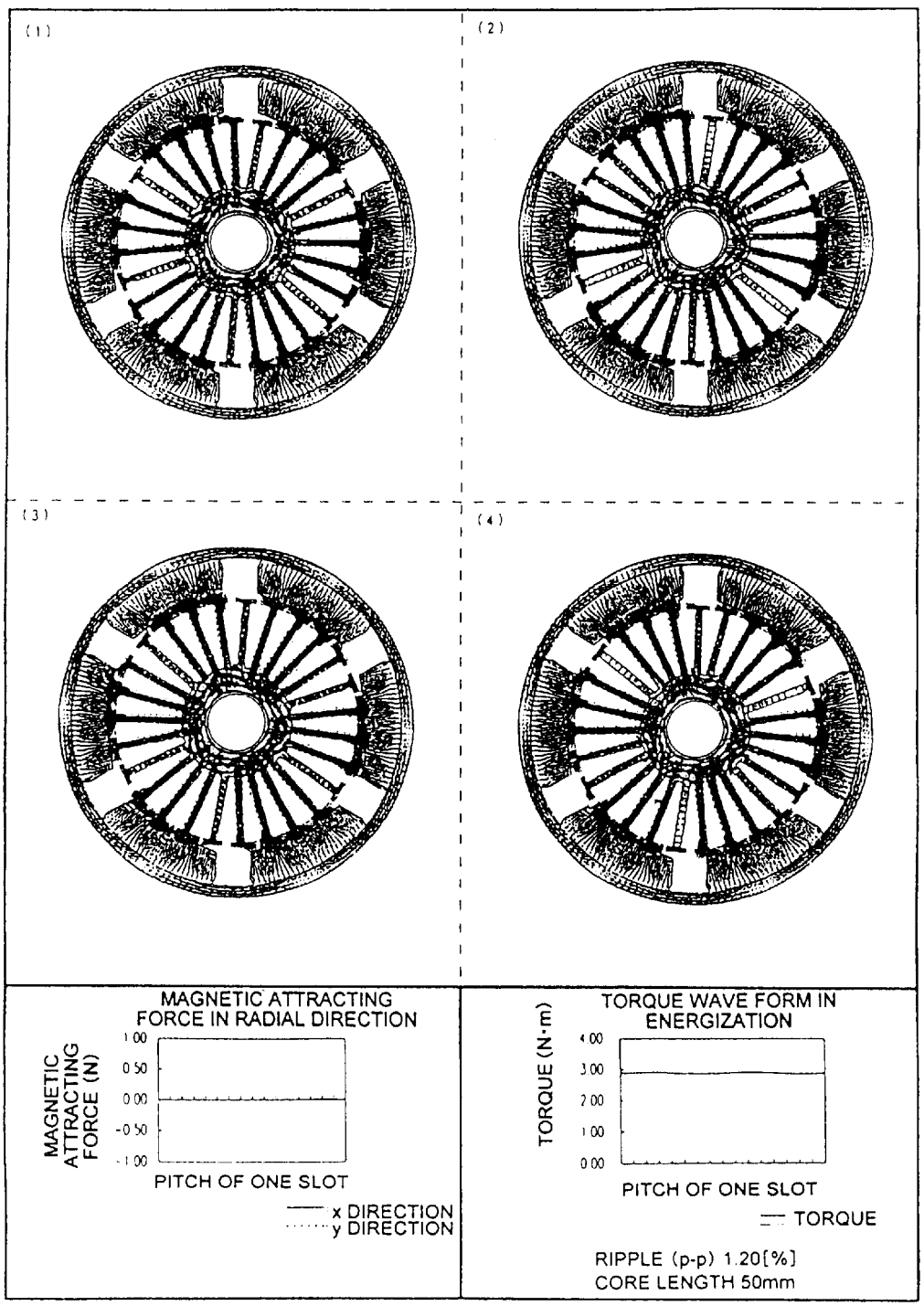
FIG. 26 is a view explaining a relationship between an electromagnetic attracting force and a torque ripple of a motor for an electric power steering assembly in a system of 6 poles, triple wave winding, 27 slots, and 6 brushes.

Further, the number of poles is not limited to 4 poles and 4 or more poles such as 6 poles, 8 poles and the like may be employed. FIGS. 24 to 26 show examples in which triple wave winding, and 6 poles/24 slots, 6 poles/21 slots, and 6 poles/27 slots are employed. Note that FIG. 8 shows an example of 6 poles/21 slots and triple wave winding, wherein a conductive wire 19 shown by a solid line, a conductive wire 19 shown by a broken line and a conductive wire 19 shown by a dot-dash-line are wound by wave winding as shown in the figure so that three winding circuits, that is, a winding circuit of the solid line, a winding circuit of the broken line, and a winding circuit of the dot-dash-line are formed. Note that the winding view is not a winding finished view.

In FIG. 24, the torque ripple is increased because the number of the slots is an integer multiple of the number of poles. FIGS. 25 and 26 show cases in which the number of the slots is an integer multiple of the number of pairs of the poles and is not an integer multiple of the number of poles. In any of the cases, no magnetic attracting force does not act in the radial direction and the torque ripple is suppressed to a low level. FIG. 27 summarizes the results of the above examples, from which it can be found that when the number of the slots is an integer multiple of the number of pairs of the poles, no magnetic attracting force is generated in the radial direction as well as unless the number of the slots is not an integer multiple of poles, the torque ripple also can be reduced. In a case of 8 poles or more, when quadruple wave winding is employed and the number of the slots is an integer multiple of the number of pairs of the poles and is not an integer multiple of the number of poles, the same result can be obtained. Note that the double wave winding, triple wave winding and quadruple wave winding are referred to as multiple wave winding. When the number of the slots is an integer multiple of the number of pairs of the poles, the circulating current can be prevented and the rectifying action can be improved because the above-mentioned equalizer members can be provided.

Further, in the electric motor of the embodiment 1, since the equalizer assembly 22, in which the terminals 24 are laminated through the insulating sheets 25, is disposed adjacent to a side of the commutator 6 and the equalizer assembly 22 having the laminated terminals 24 is subjected to a small amount of centrifugal force, it is prevented that the equalizer assembly 22 is broken by the centrifugal force as well as the length of the shaft 4 in the axial direction can be shortened.

Further, the equalizer assembly 22 can be mounted and dismounted without being interfered by the brushes. Furthermore, workability can be improved in the overhaul and assembly of the electric motor itself.

Note that the equalizer assembly 22 may be disposed adjacent to the commutator 6 on the opposite side of the hooks 34 of the commutator 6. In this case, there is a space between the armature 5 and the commutator 6 so that the conductive wire 19 of the armature 5 can be electrically connected to the hooks 34 of the commutator 6 without being interfered by the equalizer assembly.

Further, the base of the equalizer assembly and the commutator main body 15 of the commutator 6 may be formed integrally with each other by a phenol resin. In this case, since the equalizer assembly is formed integrally with the commutator, an assembly and overhaul job of the electric motor can be simplified thereby.

Further, the equalizer assembly may include a plurality of terminals, whose edges are disposed in a circumferential direction at intervals, are formed integrally with each other by an insulating resin section, wherein both the edges of arc-shaped terminal main bodies having a different diameter extend in a radial direction. In this case, the respective terminal main bodies are disposed along the diameter direction so that the length of the electric motor can be shortened in the axial direction. In addition, the insulating resin section may be formed integrally with the commutator main body by a phenol resin.

Furthermore, an insulating resin film may be formed on the surface of the equalizer assembly to prevent the short circuit of the terminals.

Embodiment 2

Figure 28:
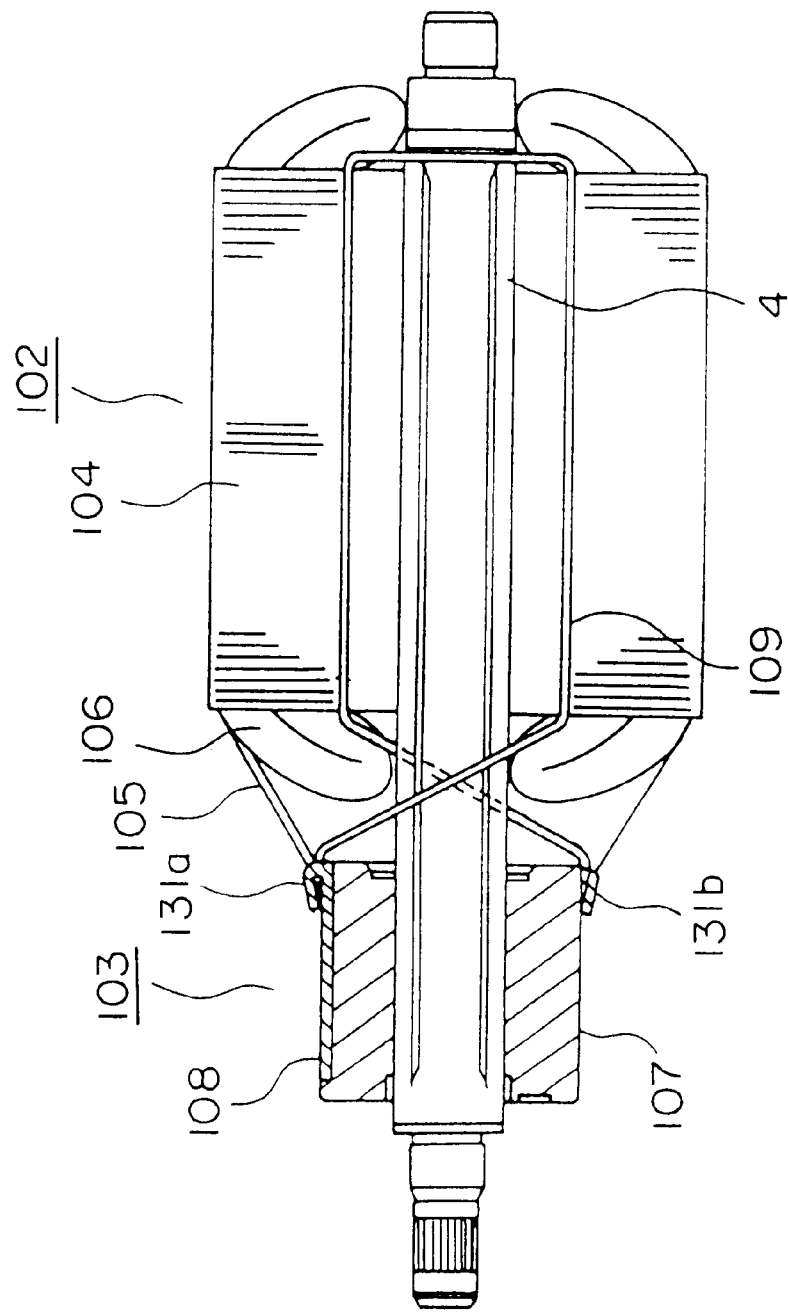
FIG. 28 is a sectional view of the interior of a motor for a power steering assembly according to an embodiment 2 of the present invention.

FIG. 28 is a sectional view of the main portion of the electric motor according to an embodiment 2 of the present invention, wherein the electric motor includes an armature 102 fixed to a shaft 4 and a commutator 103 disposed one side of the armature 102.

The armature 102 includes a core 104 having 22 slots extending in an axial direction and a winding 106 composed of a conductive wire 105 composed of an enameled copper wire and wound around the slots by a double wave winding method.

The commutator 103 includes a plurality of segments 108 fixed to an end of the yoke 1 and disposed in a circumferential direction. Voltage equalizing members 109 are connected to the segments 108 so that segments 108, which are to have the same electric potential, are electrically connected to each other. The equalizer members 109 include the same material as the conductive wire 105.

Figure 29:
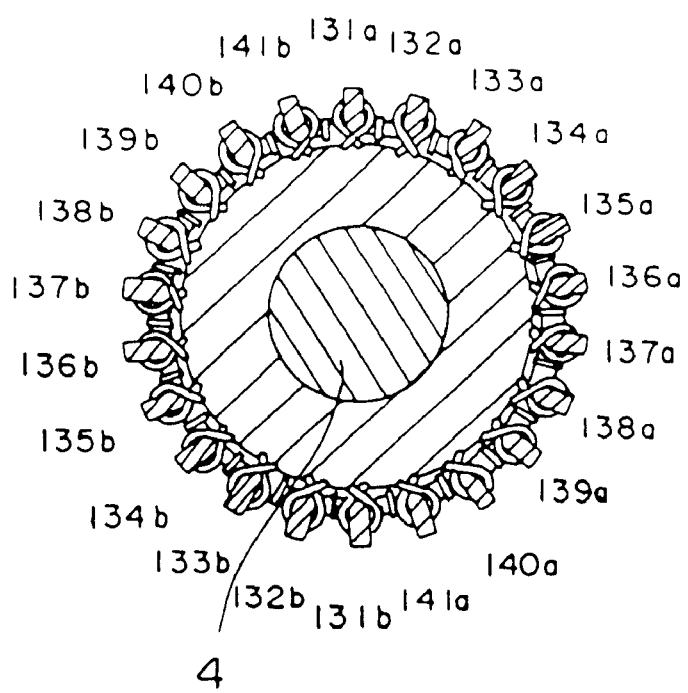
FIG. 29 is a sectional view of a commutator shown in FIG. 28.
Figure 30:
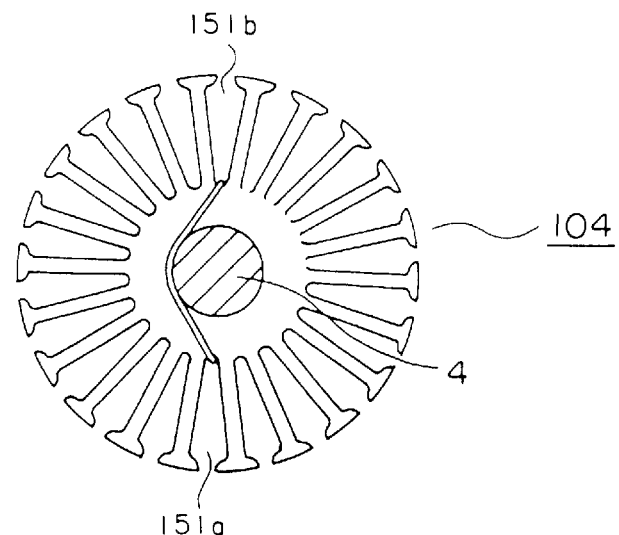
FIG. 30 is a view explaining a state in which an equalizer member is wound around a core shown in FIG. 28.
Figure 31:
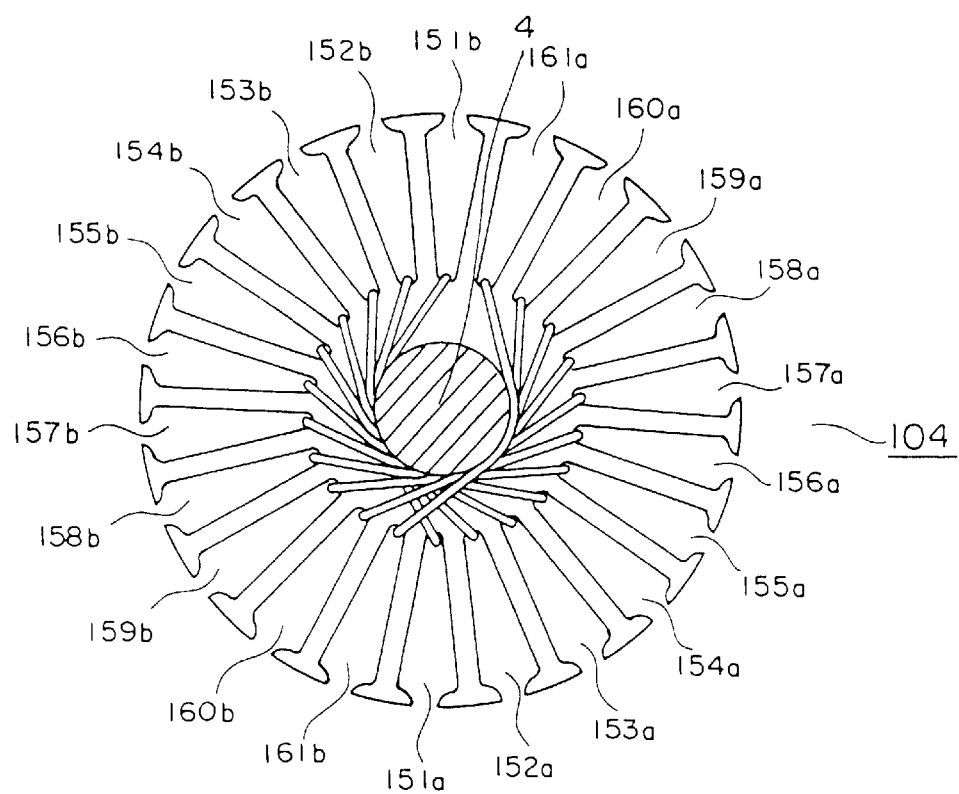
FIG. 31 is a view explaining a state in which the equalizer members are wound around the core shown in FIG. 28.

FIGS. 29 to 31 are views showing the equalizer members 109 through which the above-mentioned segments 108 are electrically connected to each other. One of the voltage equalizing lines 109 extends from the hook 131a of one of the segments 108 to one side surface of the core 104 passing through the slot 151a of the core 104, which is located at a diametrically opposite position of the hook 131*a* with an end of the equalizer member 109 locked to the hook 131*a*. Thereafter, the equalizer member 109 strides over the shaft 4 and extends to the other side surface of the core 104 passing through a slot 151*b* facing the slot 151*a* and locked to the hook 131*b* of a segment 108 which is located at a diametrically opposite position of the slot 151*b*. In the same way, another one of the equalizer members 109, one end of which is locked to a hook 132*a*, extends to the one side surface of the core 104 passing through the slot 152*a* of the core 104, which is located at a diametrically opposite position of the hook 132*a*. Thereafter, the equalizer member 109 strides over the shaft 4 and extends to the other side surface of the core 104 passing through a slot 152*b* facing the slot 152*a* and locked to the hook 132*b* of the segments 108 which is located at a diametrically opposite position with respect to the slot 152*b*. The remaining 9 equalizer members 109, the one ends of which are locked to hooks 133a to 141*a*, respectively, pass through slots 153*b* to 161*b* and slots 153*b* to 161*b* and the other ends of which are locked to hooks 133*b* to 141*b*.

Then, after the respective equalizer members 109 physically connect segments 108, which are to have the same electric potential, to each other, the conductive wire 105 is wound around the respective slots 151*a* to 161*a* and 151*b* to 161*b* of the core 104 by a double wave winding method, and the respective hooks 131*a* to 141*a* and 131*b* to 141*b* are electrically connected to the equalizer members 109 and the conductive wire 105 by fusing or the like.

In the electric motor of the embodiment 2, the respective equalizer members 109 are bridged so as to stride over the shaft 4, respectively between the respective hooks 131*a* to 141*a*, 131*b* to 141*b* and the respective slots 151*a* to 161*a*, 151*b* to 161*b* and between the slots 151*a* to 161*a* and the slots 151*b* to 161*b*, whereby the equalizer members 109 are abutted against a part of the shaft 4 and reliably positioned. Further, the equalizer members 109 are abutted against the bottom surfaces of the narrow slots 151*a* to 161*a* and 151*b* to 161*b*. Thus, a size of the armature 102 is not increased in a diameter direction by the provision of the equalizer members 109.

Figure 32:
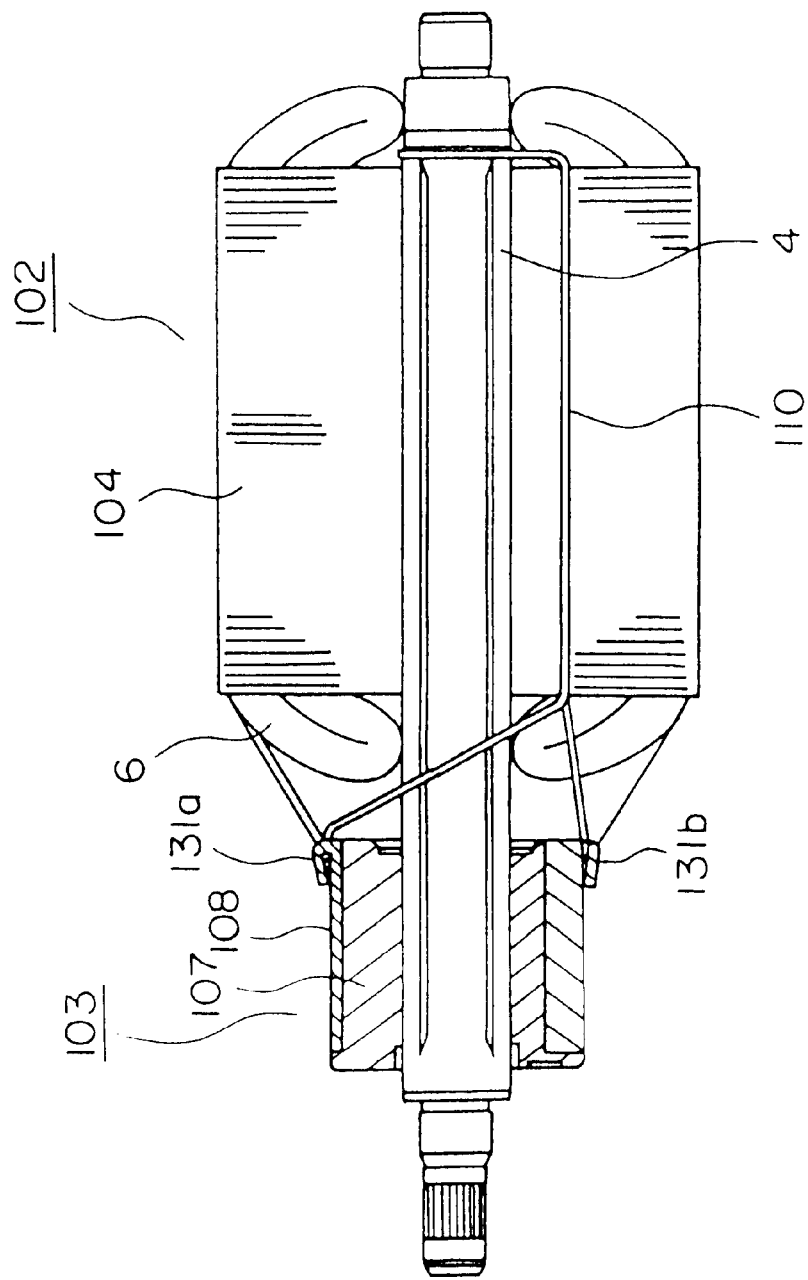
FIG. 32 is a sectional view of the interior of another motor for an electric power steering assembly.

It should be noted that equalizer members 110 may be bridged so as to stride over the shaft 4 between the hooks and the respective slots of the core, wound around the shaft 4 passing through the slot and then locked to the respective hooks passing through the same slots again as in an electric motor shown in FIG. 32. In this case, since the equalizer members 110 pass through the same slots in outward and inward paths, the voltages induced in the equalizer members 110 are canceled each other. Thus, there can be obtained a sufficient effect of preventing a circulating current generated by a difference of the voltages induced between the circuits of the winding 106.

Further, riser pieces each having an uneven cross section may be used in place of the hooks.

Furthermore, a pair of cross-wirings of the equalizer members may be disposed in parallel with each other between the commutator and the core. In this case, the nozzle of a winder and the commutator and core may be relatively moved in one direction while the equalizer members are wound around the slots of the core, whereby a winding job can be simply carried out and the winder can be simply arranged.

Embodiment 3

Figure 33:
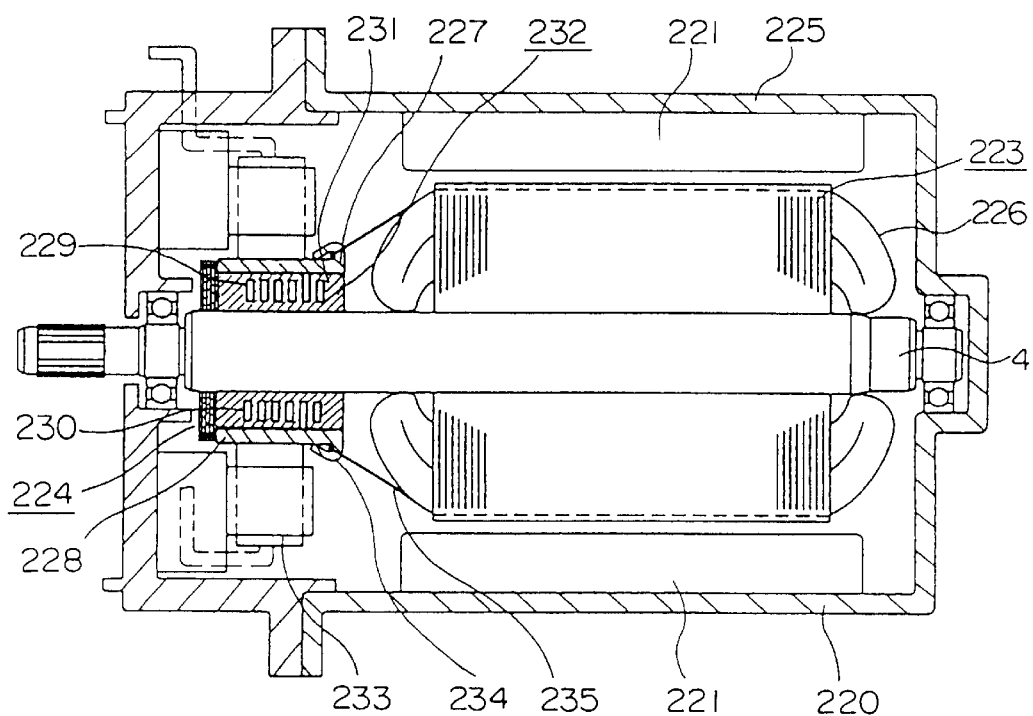
FIG. 33 is a sectional view of the interior of a motor for an electric power steering assembly including a commutator according to an embodiment 3 of the present invention.
Figure 34:
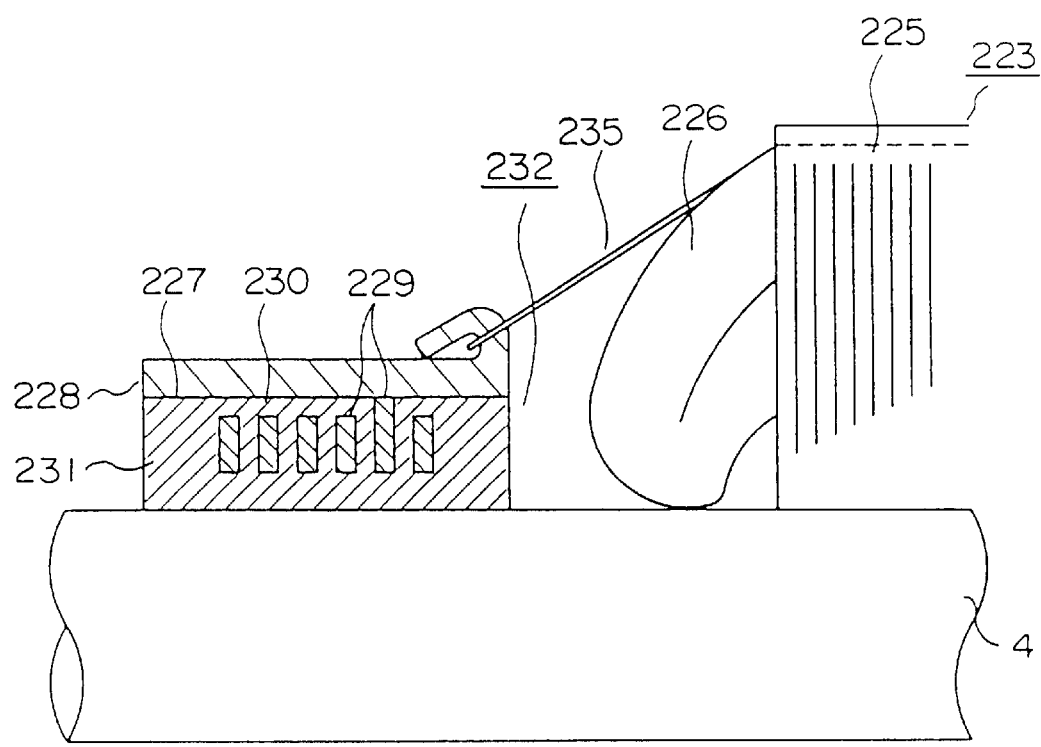
FIG. 34 is an enlarged view of the main portion of the motor for the electric power steering assembly shown in FIG. 33.
Figure 35:
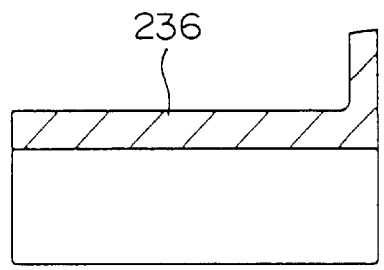
FIG. 35 is a partial sectional view of the commutator shown in FIG. 33 while the commutator is being manufactured.

FIG. 33 is a sectional view showing an electric motor including a commutator according to an embodiment 3 of the present invention, and FIG. 34 is an enlarged view of the main portion of the electric motor shown in FIG. 33.

The electric motor includes a yoke 220, a permanent magnet 221 fixed to the inner wall surface of the yoke 220, a shaft 4 rotatably disposed in the yoke 220, an armature 223 fixed to the shaft 4, and a commutator 224 fixed to the shaft 4 on one side of the armature 223.

The armature 223 includes a core 225 having a plurality of slots extending in an axial direction and a winding 226 composed of a conductive wire 235 wound around the slots by a double wave winding method.

The commutator 224, against which brushes 233 are abutted, includes a commutator main body 228 having a plurality of segments 227 disposed in a circumferential direction. The winding 226 is electrically connected to the segments 227. The space in the commutator main body 228 is filled with an insulating resin section 231 to which a plurality of equalizer members 229 are fixed. The equalizer members 229 is composed of iron and electrically connect the respective sets of the segments 227 which are composed of steel and to have the same electric potential.

FIGS. 35 to 38 are partially sectional view showing manufacturing steps of the commutator 224. First, the equalizer members 229 are disposed on the inner wall surface of a cylindrical member 236, the equalizer members 229 are fixed to the inner wall surface of the cylindrical member 236 at predetermined positions thereof using laser 234 as a fixing means, and then the interior of the cylindrical member 236 is filled with an insulating resin to thereby form the insulating resin section 231 in the cylindrical member 236. Thereafter, the plurality of segments 227 are formed by cutting off the cylindrical member 236 at equal intervals in a circumferential direction along an axial direction. Finally, the hooks 237 of the segments 227 are bent, and the segments 227 are electrically connected to the conductive wire 235.

Figure 36:
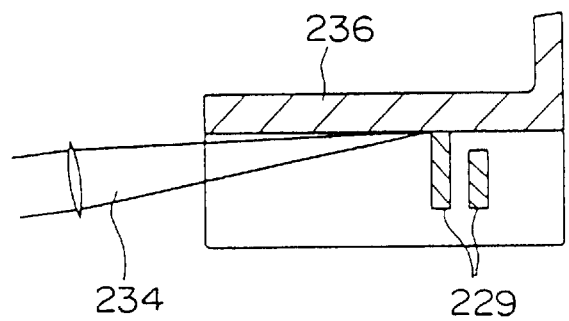
FIG. 36 is a partly sectional view of the commutator shown in FIG. 33 while the commutator is being manufactured.
Figure 37:
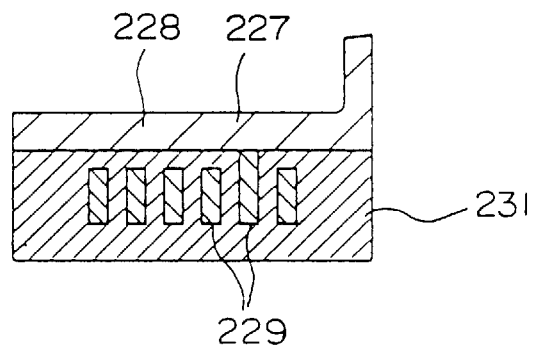
FIG. 37 is a partly sectional view of the commutator shown in FIG. 33 when the commutator is being manufactured.
Figure 38:
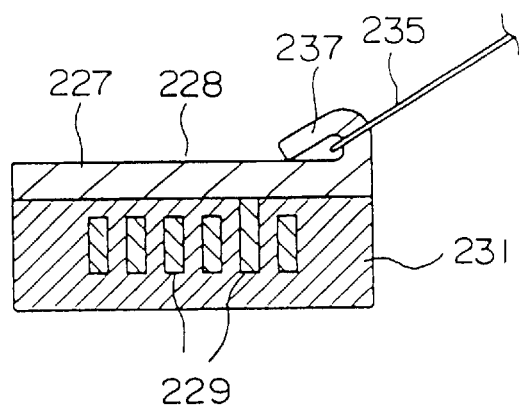
FIG. 38 is a partly sectional view of the commutator shown in FIG. 33 when the commutator has been manufactured.
Figure 39:
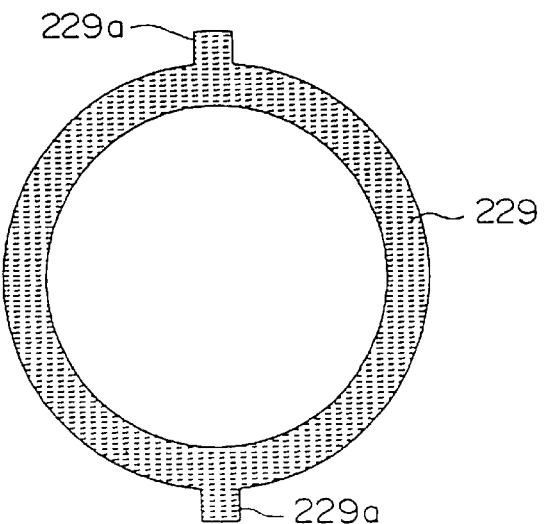
FIG. 39 is a front elevational view of an equalizer member shown in FIG. 33.
Figure 40:
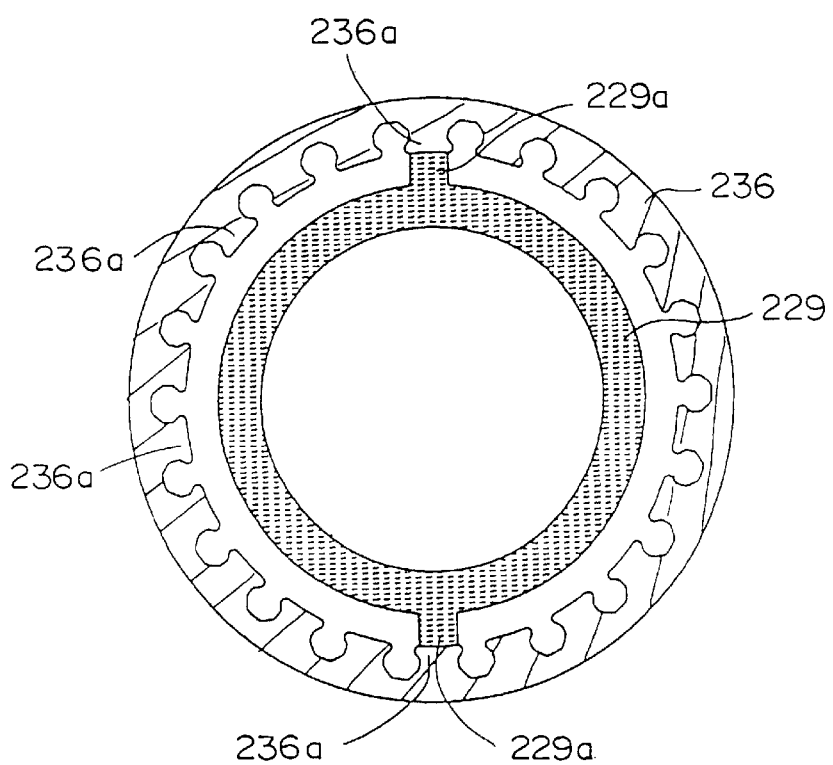
FIG. 40 is a front sectional view of the commutator shown in FIG. 33 when it is being manufactured.
Figure 41:
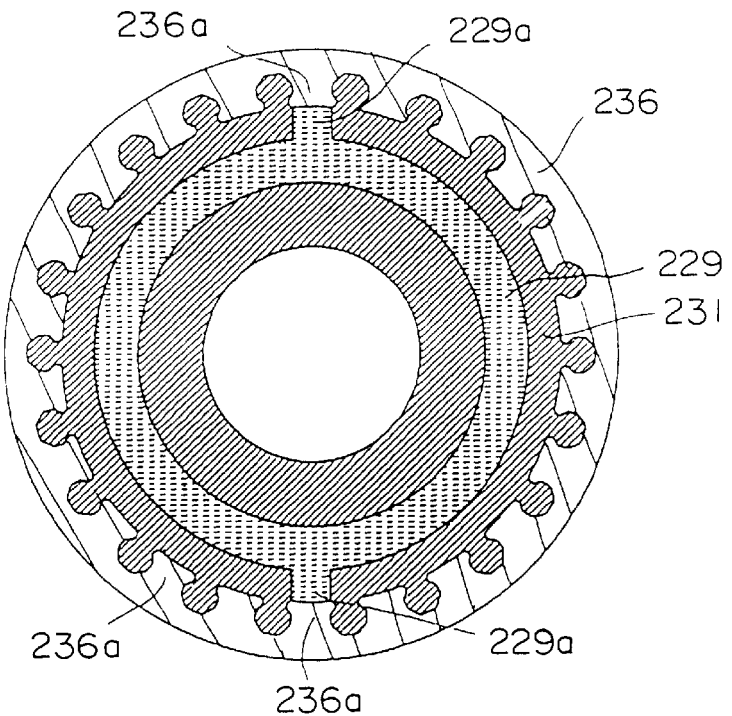
FIG. 41 is a front sectional view of the commutator shown in FIG. 33 while the commutator is being manufactured.
Figure 42:
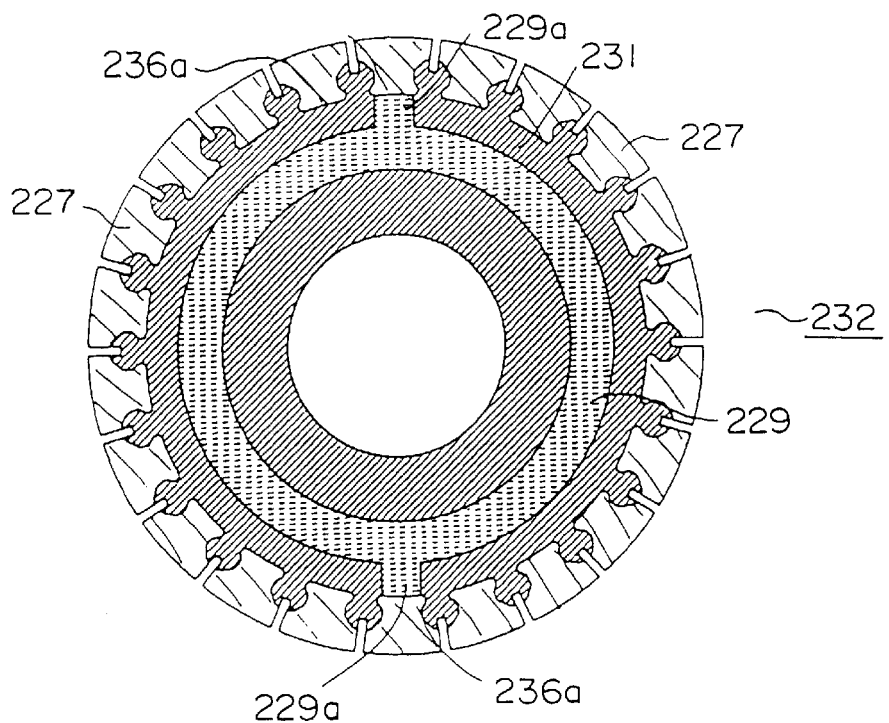
FIG. 42 is a front sectional view of the commutator shown in FIG. 33 while the commutator is being manufactured.

FIGS. 39 to 42 are views showing manufacturing steps of the commutator 224, respectively. FIG. 40 is a view showing a state in which a pair of projections 229*a* formed to a ring-shaped equalizer member 229 is welded to a predetermined teeth section 236a of the cylindrical member 236 by the laser 234 (FIG. 36 is a corresponding view.). FIG. 41 is a view showing a state in which the insulting resin is filled in the space of the cylindrical member 236 by insert molding and the insulating resin section 231 is formed (FIG. 37 is a corresponding view.). FIG. 42 is a view showing a state in which the plurality of segments 227 are formed by cutting off the cylindrical member 236 at the equal intervals in the circumferential direction along the axial direction (FIG. 38 is a corresponding view).

In the electric motor arranged as described above, the plurality of equalizer members 229 are disposed internally of the commutator main body 228 and made compact as well as more reliably fixed by the insulating resin section 231, whereby segments 227, which are to have the same electric potential, are electrically connected to each other reliably.

It should be noted that while an example in which the laser welding is used for fixing is described in the above embodiment, a fixing means other than the laser welding, for example, soldering and a conductive resin may be used or they may be used in combination. In this case, a material of the equalizer members is not limited to ion and copper or the like may be used.

Note that a recess as a portion to be locked may be formed on the inner wall surface of each segment, and a protrusion as a locking portion to be engaged with the recess may be formed to the projecting portion of each equalizer member. In this case, the equalizer members can be positioned reliably in the circumferential direction with respect to the segments and electrically connected thereto reliably.

A portion to be fitted may be formed to the root of each segment, and a fitting portion, which is fitted to the portion to be fitted, may be formed to the projecting portion of each equalizer member so that the segments are prevented from flying out by centrifugal force when the commutator is rotated.

Each segment may have a groove formed to the inner wall surface thereof which has a different depth from the end surface thereof in the axial direction so that the respective equalizer members are disposed at predetermined intervals by fixing the projecting portions of the equalizer members to the bottom surfaces of the grooves.

A spacer may be provided with each equalizer member to secure intervals between neighboring equalizer members, whereby the short circuit between the neighboring equalizer members and between segments other than the respective sets of the segments to be connected and the equalizer members can be reliably prevented.

Commutator pieces may be formed by forming an equalizer member main body by premolding the plurality of equalizer members with an insulating resin, then inserting and mounting the equalizer member main body in the inner side of a cylindrical member, thereafter filling the space between the cylindrical member and the equalizer member main body with an insulating resin, and finally cutting off the cylindrical member to a plurality of pieces at intervals in the circumferential direction along the axial direction.

The respective positions, at which the segments are connected to the equalizer members, may be located so as to have the same distance from the end surface of the commutator main body so that welded positions have the same height in order to simply arrange a welder.

Further, the equalizer members may be formed in the same shape in which the equalizer members obliquely travel in the axial direction along the inner wall surface of the commutator main body and the equalizer members are combined with each other. As a result, the respective positions at which the segments are connected to the equalizer members can be limited to two positions from the end surface of the commutator main body, whereby an amount the material of the equalizer members to be used can be reduced as well as workability can be improved in a connecting job.

Embodiment 4

Figure 43:
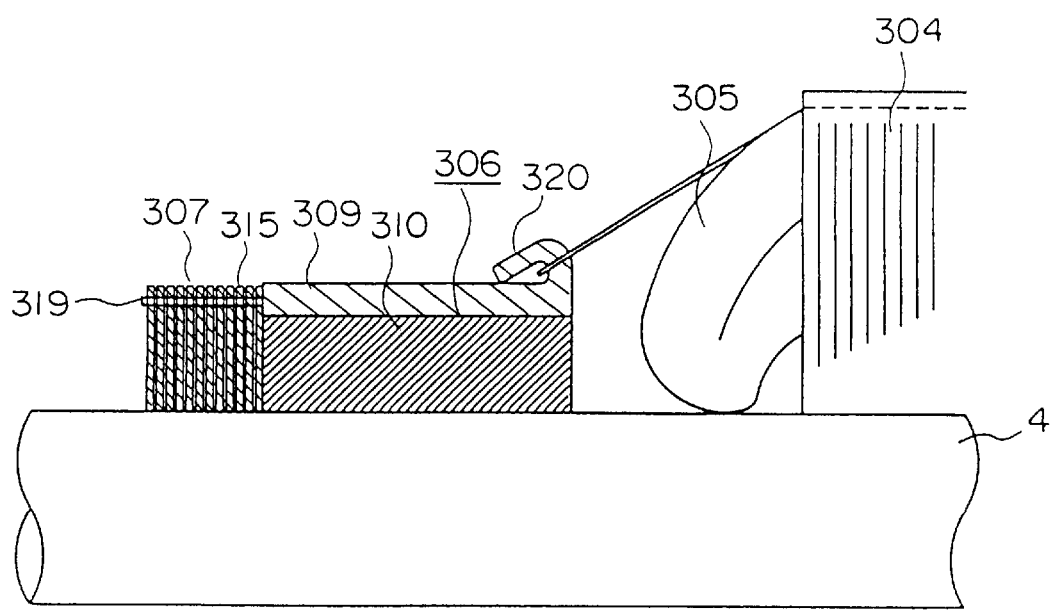
FIG. 43 is a sectional view of the main portion of the motor for the electric power steering assembly according to an embodiment 4 of the present invention.

FIG. 43 shows a sectional view of the main portion of the electric motor according to an embodiment 4 of the present invention, wherein a commutator 306 includes a plurality of segments 309 disposed at equal intervals in a circumferential direction and a commutator mold section 310 disposed inwardly of the segments 309 for fixing the segments 309 and insulating between the segments 309.

Figure 44:
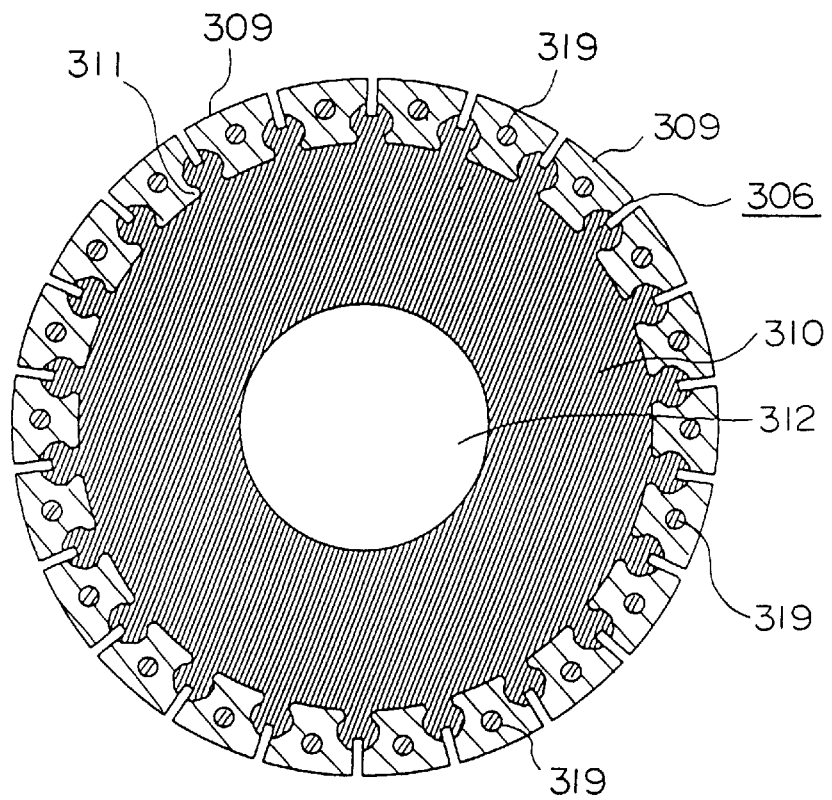
FIG. 44 is a sectional view of a commutator shown in FIG. 43.
Figure 45:
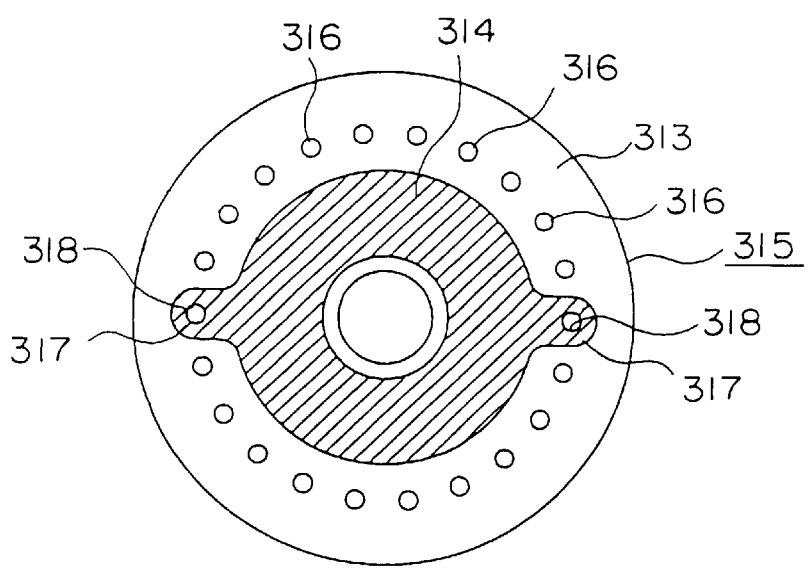
FIG. 45 is a front elevational view of a printed circuit board of an equalizer assembly shown in FIG. 43.
Figure 46:
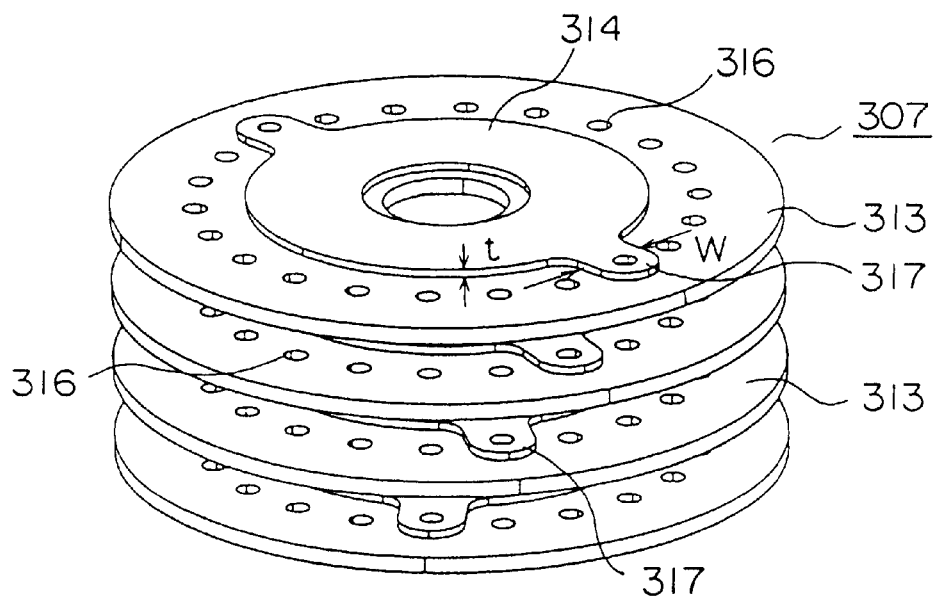
FIG. 46 is a conceptual view of a laminating method of the printed circuit board shown in FIG. 43.
Figure 47:
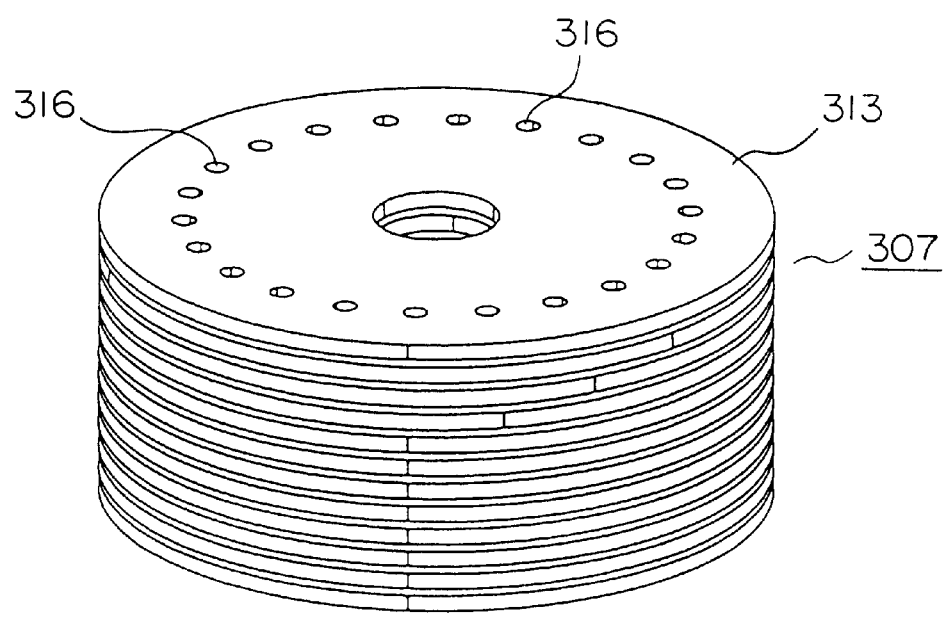
FIG. 47 is a perspective view of the equalizer assembly shown in FIG. 43.
Figure 48:
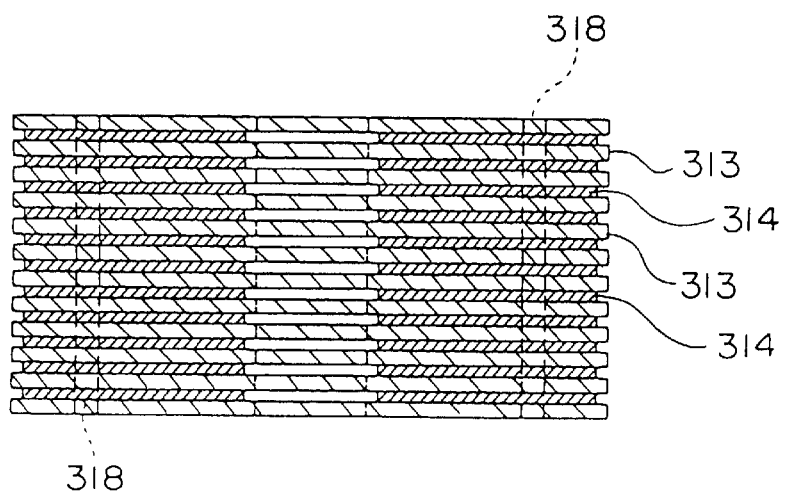
FIG. 48 is a sectional view of the equalizer assembly shown in FIG. 43.

FIG. 44 is a sectional view of the commutator 306 shown in FIG. 43, wherein fitting portions 311 are formed to the roots of the segments 309 to maintain a distance between the respective segments 309 as well as to fix the segments 309 to the commutator mold section 310. In insert molding, a resin charged into a metal mold flows between the fitting portions 311. After the resin has been solidified, it is arranged as a section for supporting the segments 309. Further, a shaft hole 312, through which a shaft 303 passes, is defined through the commutator mold section 310 on the inner diameter side thereof. That is, the commutator mold section 310 also achieves a role for fixing the commutator 306 to the shaft 303, in addition to a role for supporting the segments 309 against centrifugal force and a role for securing a distance between the segments 309.

FIGS. 45 to 48 show an equalizer assembly 307 shown in FIG. 43. The equalizer assembly 307 includes a plurality of laminated printed circuit boards 315 each having a connecting sheet 314, which acts as an equalizer member, formed by subjecting a conductor layer to etching or the line on an insulating substrate 313. Through holes 316 are defined around the circumferential edge of the insulating substrate 313 at equal intervals. The number of the through holes 316 corresponds to the number of the segments 309. Since the electric motor of the embodiment 4 is a DC electric motor having 22 segments, 4 poles and 22 slots and employing double wave winding, 22 pieces of the through holes 316 are defined. Patterns are formed to the connecting sheets 314 as the equalizer members to connect segments 309 which are to have the same electric potential at all times. That is, each connecting sheet 314 has projections 317 which are located at confronting positions and project radially outwardly, and each of the projections 317 has a through hole 318 defined therethrough.

The equalizer assembly 307 may be formed by laminating the plurality of printed circuit boards 315 formed in a circular shape. Otherwise, the equalizer assembly 307 may be formed by forming a plurality of connecting sheets by etching one insulating sheet, laminating a plurality of the insulating sheets, and then separating the laminated insulating sheets to respective equalizer assemblies 307 by stamping or the like. Further, when it is supposed that each connecting sheet 314 has a thickness t of 70 μm and each projection 317 has a width w of 5 mm, each projection 317 has a cross sectional area of $0.35^2$ mm, whereby a current capacity, which is approximately the same as that of a conductive wire having a diameter of 0.7 mm, can be secured.

Figure 49:
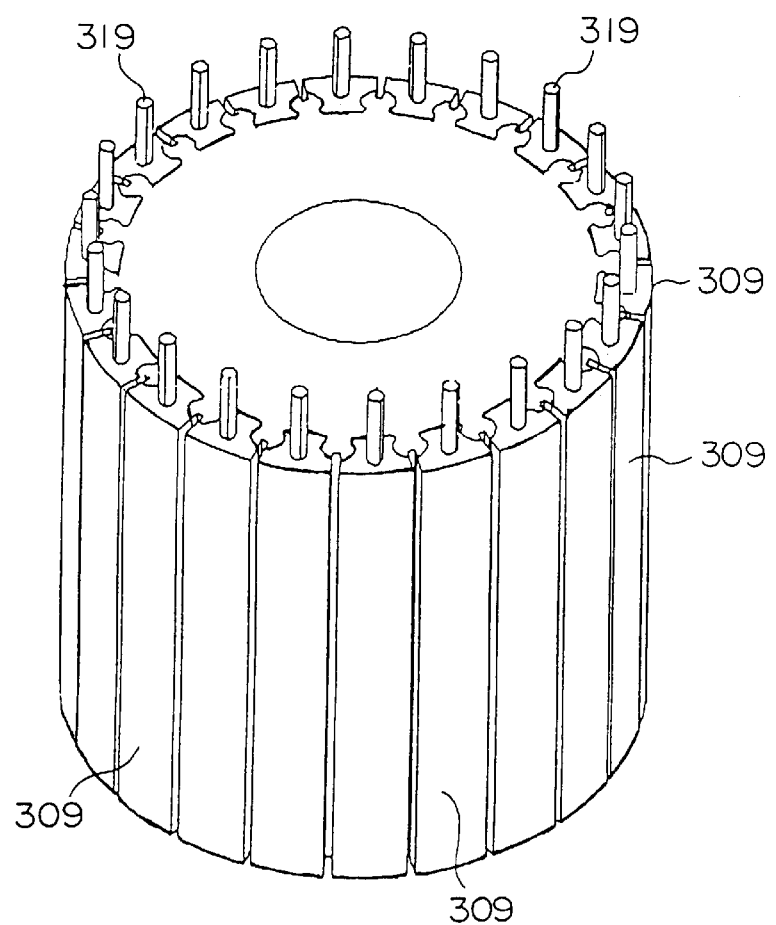
FIG. 49 is a perspective view of the commutator shown in FIG. 43.
Figure 50:
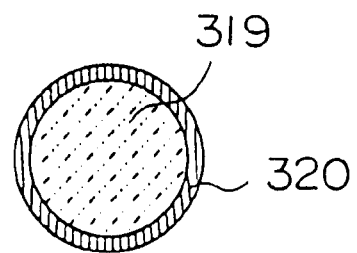
FIG. 50 is a lateral sectional view of a projection for connecting a segment shown in FIG. 43.
Figure 51:
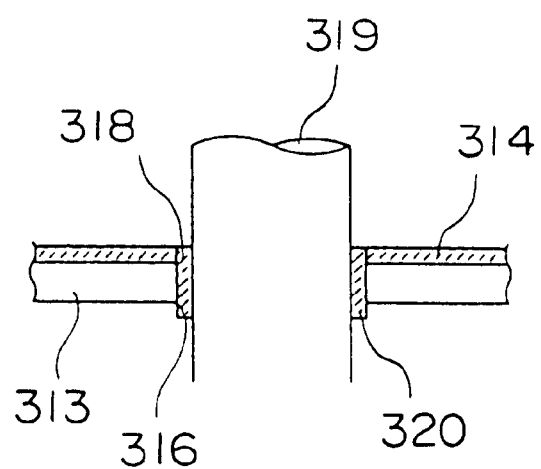
FIG. 51 is a sectional view showing how the segment connecting projection shown in FIG. 43 is connected to the printed circuit board.

Next, how the segments 309 are connected to the connecting sheets 314 of the printed circuit boards 315 will be described with reference to FIGS. 49 to 51. As shown in FIG. 49, each segment 309 has a round-bar shaped connecting projection 319 previously formed integrally therewith. In contrast, a conductive film 320 is formed on the inner wall surface of the through hole 318 of each connecting sheet 314 and on the inter surface of the through hole 316, which is aligned with the through hole 318, of each insulating substrate 313. Then, the segments 309 are electrically connected to the connecting sheets 314 by pressure inserting the connecting projections 319 into a through hole through which the through holes 318 are aligned with the through holes 316.

It should be noted that the connecting projections 319 also pass through the through holes 316 of the insulating substrates 313 which are not aligned with the through holes 318 of the connecting sheets 314 so as to connect segments 309, which are to have the same electric potential, through the other connecting sheets 314 to each other.

Figure 52:
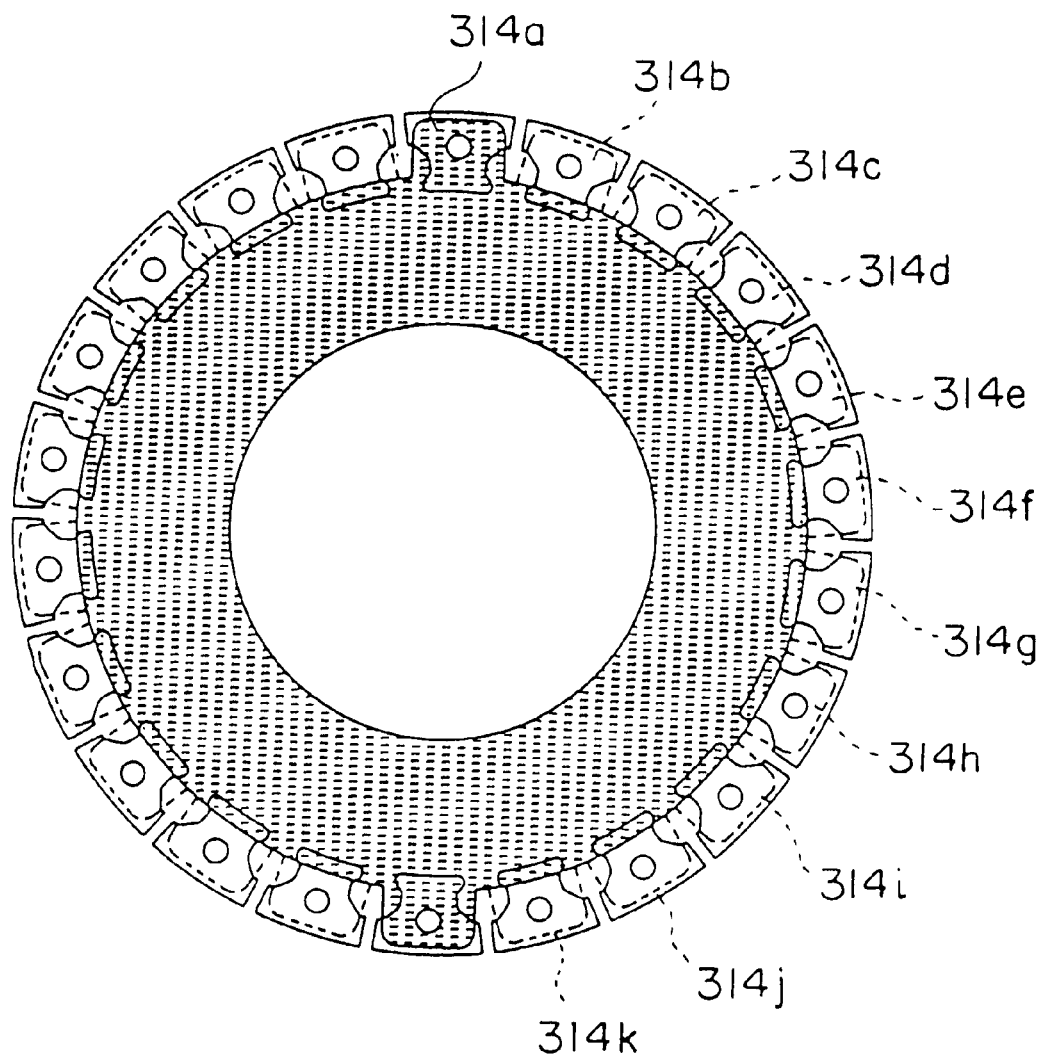
FIG. 52 is a view showing how the segment shown in FIG. 43 is connected to a connecting sheet.

FIG. 52 shows a positional relationship between the segments 309 and the connecting sheet 314. The equalizer assembly 307 of the embodiment 4 includes 11 pieces of connecting sheets 314a to 314k as the equalizer members which are electrically connected to the segments 309 which are located at the positions at which the projections 317 of the connecting sheets 314a to 314k face each other. Note that the connecting sheets 314a to 314k may be laminated in any arbitrary order.

In the electric motor arranged as described above, the equalizer assembly 307 is disposed on the side surface of the commutator 306 which is located at a position opposite to hooks 320 as shown in FIG. 43. Thus, when a winding 305 is applied to a core 304, the equalizer assembly 307 does not obstruct a winding job. Further, an outside diameter of the equalizer assembly 307 is smaller than an outside diameter of the commutator 306 in contact with brushes. Accordingly, in a assembling process for assembling a rotor to a stator, a job need not be carried out while moving the brushes externally of the radius of the commutator 306, whereby productivity of the electric motor can be improved.

Note that each connecting projection 319 is not limited to the one having the round bar shape and may be arranged as a square-bar shaped connecting projection. In this case, since the connecting projections partly come into contact with the conductive films through the corners thereof, the connecting projections can be more simply pressure inserted into the through hole.

After the connecting projections have been inserted, they may be fixed to the printed circuit boards by a means such as soldering using a soldering material such as solder, copper or the like.

In the commutator, hook-shaped locking portions may be formed at both the ends of each segment.

In an electric motor having 8 poles and 24 slots, since there are 6 sets of 4 segments in total which are to have the same electric potential, the equalizer assembly may be electrically connected to 4 segments through the equalizer member of a single printed circuit board.

While it is preferable that all the connecting sheets of the printed circuit boards be connected to all the commutator pieces, which are to intrinsically have the same electric potentials, the connection of some of the connecting sheets may be omitted when necessary.

The equalizer assembly may be arranged such that connecting pins provided separately from the segments pass through the printed circuit boards. In this case, the positioning accuracy of the connecting pins can be more improved, and the accuracy of the cross sectional size of each connecting pin can be easily managed. When many connecting pins are provided, the area where the connecting sheets are in contact with the connecting pins can be increased, whereby a current capacity can be increased in the contact area.

The connecting pins may be previously formed integrally with a plurality of printed circuit boards and the equalizer assembly may be formed integrally with the commutator by inserting the ends of the connecting pins projecting from the printed circuit boards into the commutator. In this case, the plurality of printed circuit board, which are less strong mechanically, are previously formed as a block and the equalizer assembly is coupled with the commutator in this state, productivity can be improved.

The equalizer assembly may be disposed on the side of the hooks of the segments at the end of the commutator in an axial direction and may have an outside diameter smaller than that of the commutator. In this case, the conductive wire can be wound around the core without obstructing a winding process carried out by an automatic winder as well as a length of the electric motor can be shorted in the axial direction.

The equalizer assembly may be formed integrally with the commutator with a resin at an end of the commutator in the axial direction. In this case, both the equalizer assembly and the commutator are fixed to each other strongly, whereby the mechanical strength thereof can be improved.

A shape of each connecting sheet of the equalizer assembly is not limited to the circular shape and any pattern may be used so long as it has a shape for connecting segments which are to have the same electric potential.

Further, the equalizer assembly may be arranged so as to form the connecting sheets on both the surfaces of each insulating substrate. In this case, the laminated number of the printed circuit boards can be reduced, whereby a length of the electric motor can be shortened in the axial direction.

Embodiment 5

Figure 53:
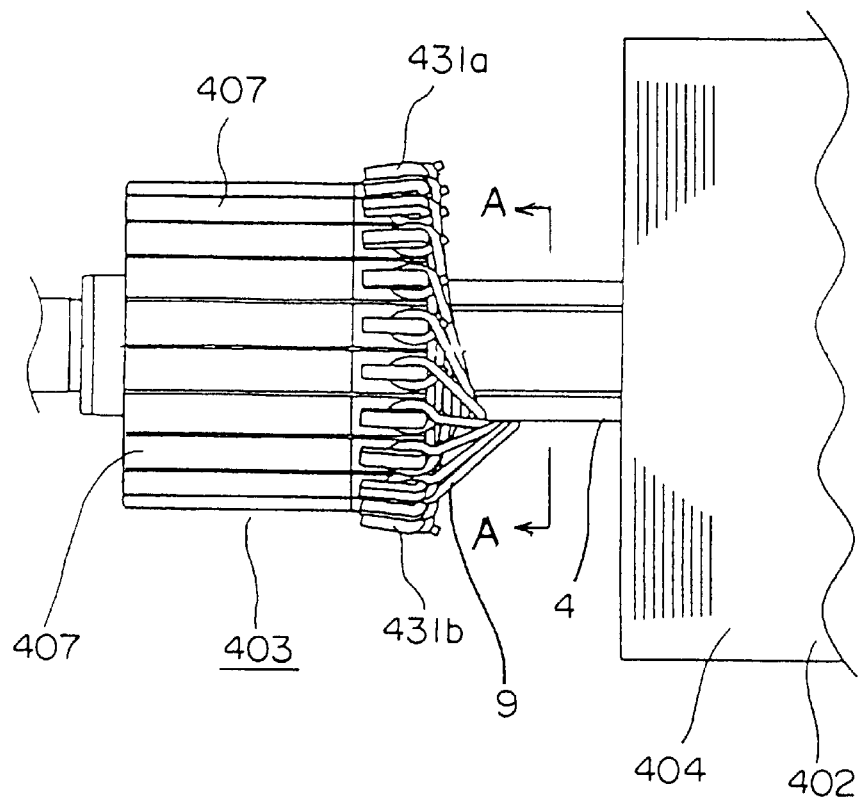
FIG. 53 is a sectional view of the main portion of the motor for an electric power steering assembly according to an embodiment 5 of the present invention.
Figure 54:
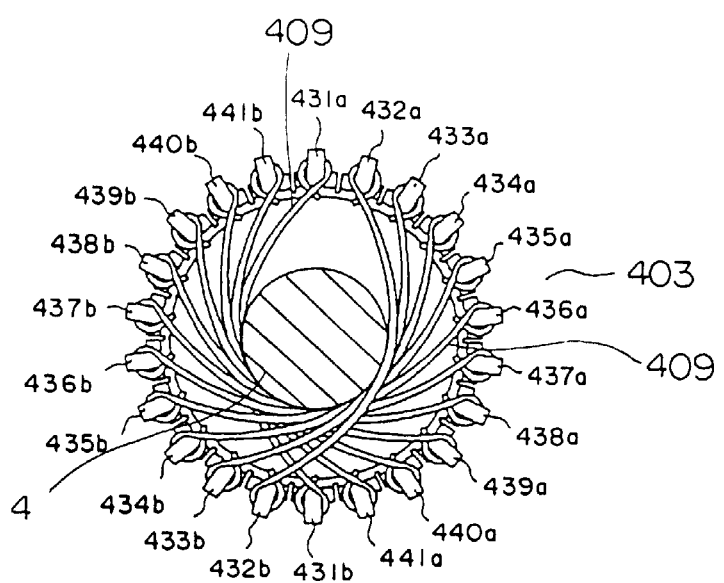
FIG. 54 is a sectional view of the motor for an electric power steering assembly taken along line A—A of FIG. 53.
Figure 55:
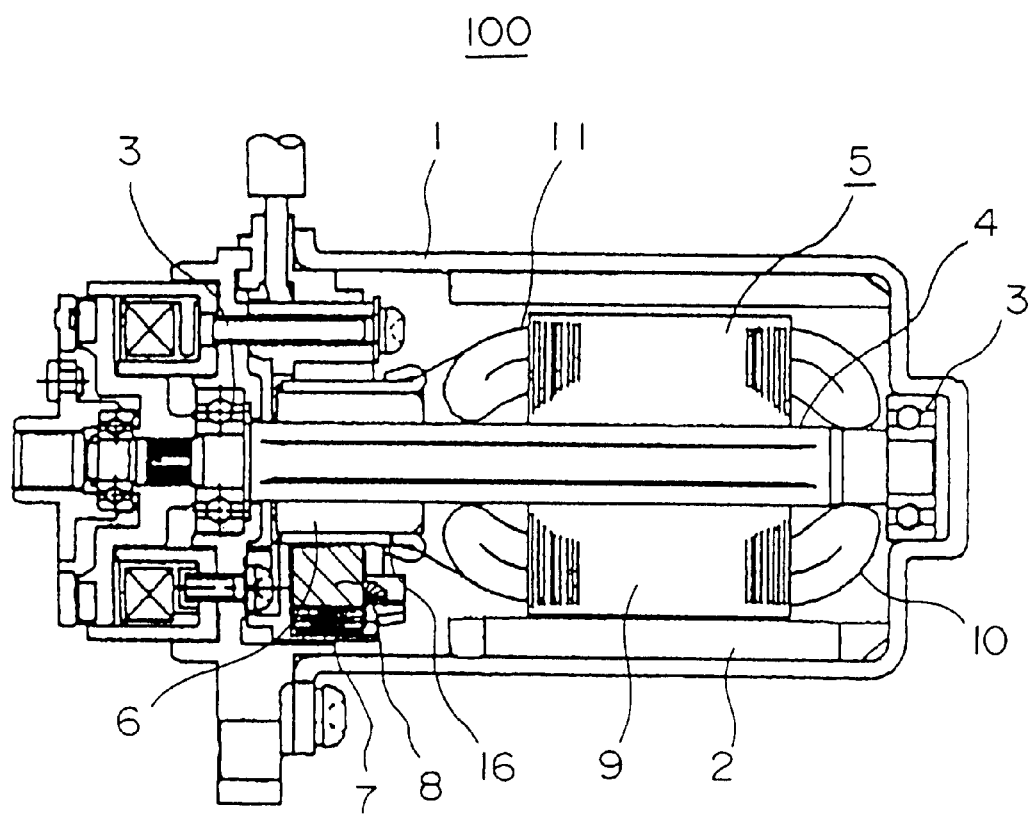
FIG. 55 is a sectional view of a conventional motor for an electric power steering assembly.
Figure 58:
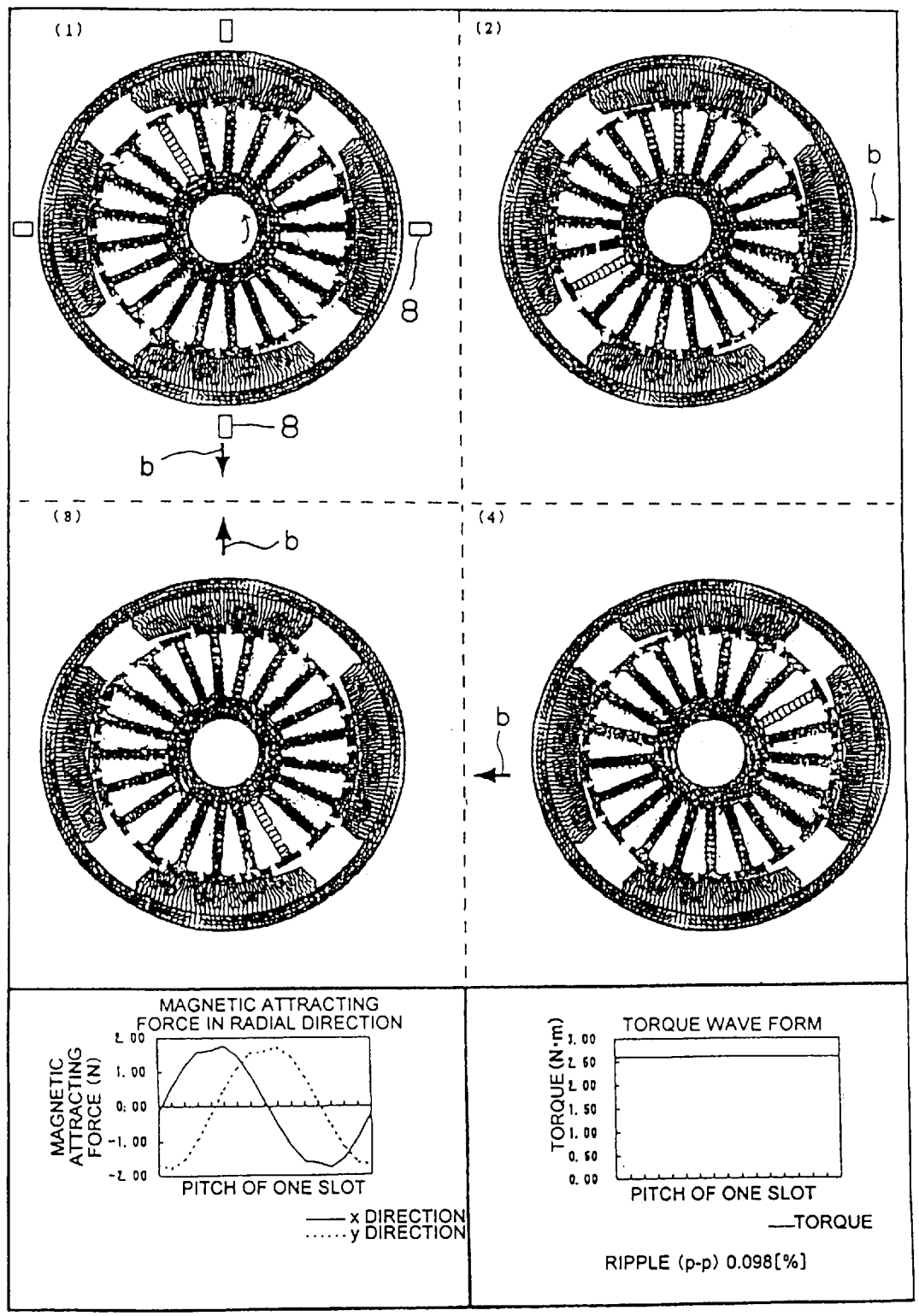
FIG. 58 is a graph explaining an electromagnetic attracting force and a torque ripple of a motor for an electric power steering assembly in a system of 4 poles, superimposed winding, 21 slots and 4 brushes.

FIG. 53 is a sectional view of the main portion of the electric motor according to an embodiment 5 of the present invention, and FIG. 54 is a sectional view of the electric motor taken along line A—A FIG. 53.

In the electric motor, equalizer members 409 are disposed in intimate contact with a commutator 403 having 22 pieces of segments 407 which are fixed at an end of a shaft 401 and disposed in a circumferential direction.

One end of one of the equalizer members 409 is locked to the hook 431$a$ of one of the segments 407 and the other end thereof is locked to the hook 431$b$, which faces the hook 431$a$, of the one segment. In the same way, One end of another one of the equalizer members 409 is locked to the hook 432$a$ of another one of the segments 407 and the other end thereof is locked to a hook 432$b$ facing the hook 432$a$. The other 9 equalizer members 409 also are locked to hooks 433$a$ to 441$a$ at one ends thereof and to hooks 433$b$ to 441$b$ at the other ends thereof.

In the electric motor arranged as described above, the equalizer members 409 and a conductive wire utilize a wire having the same diameter and composed of the same material (enameled copper wire), the equalizer members 409 are in intimate contact with a side surface of the commutator 403 and a winding is wound around a core 404.

A manufacturing procedure in this case is such that, first, a wire is locked to the hooks of segments 407, which are to have the same electric potential, and then cut. The above job is repeated to connect the one ends of the 11 pieces of the equalizer members 409 to the hooks 431$a$ to 441$a$ and the other ends thereof to the hooks 431$b$ to 441$b$, respectively. Thereafter, a wire is wound around the core 404 through the hooks 431$a$ to 441$b$ by a double wave winding method, thereby providing the winding with the core 404. A series of processes for locking, cutting and winding the wire can effectively carried out by a winder.

After segments 407, which are to have the same electric potential, have been physically connected to each other and the conductive wire 406 has been wound around the respective slots of the core 404, the respective hooks 431$a$ to 441$b$ are electrically connected to the equalizer members 409 and the conductor wire by fusing or the like at the same time, respectively.

It should be noted that the disposition of a locking section, to which the equalizer members are locked, to the hooks of the segments on the core side thereof, makes it unnecessary to successively manufacture the winding after the connecting process of the equalizer members, whereby a degree of freedom of an electric motor manufacturing process can be improved.

The equalizer member locking section may be disposed to a side opposite to the hooks. In this case, the conductive wire can be smoothly wound around the slots through the hooks so as to form the winding without being influenced by the equalizer members.

The equalizer members, which have been locked to the equalizer member locking section material may be formed integrally with the commutator with a resin. In this case, the equalizer members can be reliably connected to the locking section without being removed therefrom halfway in manufacturing, whereby productively can be improved.

Further, a cylindrical guard, which is to be fitted to the shaft, may be disposed on a side surface of the commutator, and the segments may be electrically connected to each other in a state in which the equalizer members are wound around the guard. In this case, it is not necessary to lock the equalizer members by winding them around the shaft, whereby a degree of freedom of the manufacturing process can be improved.

It should be noted that while the above respective embodiments have been described as to the electric motor, the present invention also can be applied to a generator. Further, the numbers of the poles, slots and equalizer members are not limited to those in the examples described in the embodiments.

As described above, a rotary electric machine according to one aspect of the present invention comprises: a yoke; a multi-polar magnetic field portion composed of 4 poles fixed to the inner wall of said yoke; a shaft disposed within the yoke so as to be able to rotate freely; an armature fixed to the shaft having a winding composed of a conductor wire wound by double wave winding into an even number of slots formed on the outer circumferential surface of a core so as to extend in the axial direction thereof; a commutator comprising a plurality of segments fixed to an end portion of the shaft; and a plurality of brushes contacting the surface of the commutator. Therefore, since a total of a magnetic attracting force to the armature is zero in a radial direction, rotary oscillation, which is a factor causing operation noise, is not generated so that the operation noise can be reduced.

According to one form of the rotary electric machine, the number of the slots may be an even number and not an integer multiple of the number of the poles. Therefore, the operation noise can be reduced as well as a torque ripple also can be decreased, whereby steering feeling of a driver placing hands on a steering wheel can be improved.

A rotary electric machine according to another aspect of the present invention comprises: a yoke; a multi-polar magnetic field portion composed of 4 poles fixed to the inner wall of the yoke; a shaft disposed within the yoke so as to be able to rotate freely; an armature fixed to the shaft having a winding composed of a conductor wire wound by double wave winding into a number of slots being an integer multiple of pairs of the poles, the slots being formed on the outer circumferential surface of a core so as to extend in the axial direction thereof; a commutator comprising a plurality of segments fixed to an end portion of the shaft; and a plurality of brushes contacting the surface of the commutator. Therefore, since the total of the magnetic attracting force to the armature is zero in the radial direction, the rotary oscillation, which is the factor causing the operation noise, is not generated so that the operation noise can be reduced.

According to one form of the rotary electric machine, the number of the slots may be an integer multiple of the number of the pole pairs and be not an integer multiple of the number of the poles. Therefore, the operation noise can be reduced as well as the torque ripple also can be decreased, whereby the steering feeling of the driver placing hands on the steering wheel can be improved.

A rotary electric machine according to still another aspect of the present invention comprises: a yoke; a multi-polar magnetic field portion composed of at least 6 poles fixed to the inner wall of the yoke; a shaft disposed within the yoke so as to be able to rotate freely; an armature fixed to the shaft having a winding composed of a conductor wire wound by multiple wave winding into a number of slots being an integer multiple of the number of pairs of the poles and being not an integer multiple of the number of the poles, the slots being formed on the outer circumferential surface of a core so as to extend in the axial direction thereof; a commutator comprising a plurality of segments fixed to an end portion of the shaft; and a plurality of brushes contacting the surface of the commutator. Therefore, since the total of the magnetic attracting force to the armature is zero in the radial direction, the rotary oscillation, which is the factor causing the operation noise, is not generated so that the operation noise can be reduced.

According to one form of the rotary electric machine, the equalizer members electrically may connect between circuits in an armature circuit. Therefore, a circulating current flowing to the brushes due to a difference of electromotive forces induced between the armature circuits can be prevented. As a result, a brush rectifying action can be improved and further rectification sparks generated from the brushes can be suppressed. Further, magnitudes of the operation noise and the torque ripple can be reduced, respectively.

According to another form of the rotary electric machine, the number of equalizing members may be determined by $Ns/(n \times 2) \leq K \leq Ns$, where k represents the number of the equalizer members, Ns represents the number of the slots of the core, and n represents a maximum number of the segments covered by the brushes. Therefore, the number of the equalizer members can be appropriately set, whereby over quality can be prevented.

According to still another form of the rotary electric machine, the equalizer assembly may includes equalizer members disposed adjacent to the armature on the axial line thereof and laminated in the axial line. Therefore, since the shaft is adjacent to a position where the equalizer assembly is disposed, the equalizer assembly is subjected to a small amount of centrifugal force, whereby the equalizer assembly can be prevented from being broken by the centrifugal force. Further, lengths of the armature and the motor can be shortened in the axial direction. Further, the equalizer assembly can be smoothly mounted and dismounted without being interfered by the brushes. Furthermore, workability can be improved in the overhaul and assembly of the electric motor itself.

According to still another form of the rotary electric machine, the other end of an equalizer member, whose one end may be connected to a segment, may be connected to other segment through a slot. Therefore, since the equalizer members are accommodated in the slots, members for holding the equalizer members are not necessary as well the rotary electric machine can be reduced in size.

According to still another form of the rotary electric machine, the equalizer members may be disposed inwardly of a cylindrical commutator main body composed of a plurality of the segments disposed in a circumferential direction. Therefore, the equalizer assembly is made compact as well as the equalizer members are reliably fixed by the insulating resin section, and segments, which are to have the same electric potentials, are electrically connected to each other reliably.

According to still another form of the rotary electric machine, a printed circuit board may include an insulating substrate and the equalizer members electrically connected to the segments and composed of a conductive film formed on the insulating substrate. Therefore, the rotary electric machine can be reduced in size. Further, since the commutator is formed separately from the equalizer members, a proper capacitance, which is smaller than that of the commutator, can be set to the equalizer members.

According to still another form of the rotary electric machine, the equalizer members may be disposed in intimate contact with a side surface of the armature. Therefore, since members for supporting the equalizer members are not necessary, the number of components can be reduced as well as a space occupied by the equalizer members is decreased, whereby an overall size of the rotary electric machine can be reduced.

According to still another form of the rotary electric machine, a current supplied to the winding may be controlled by PWM (pulse width modulation) drive. Therefore, a desired voltage can be imposed while reducing a power loss and the control unit can be decreased in size.

According to still another form of the rotary electric machine, the conductor wire may be an enameled round wire. Therefore, a process for winding the conductive wire around the core can be carried out by a machine more simply, whereby the armature can be mass-produced and the manufacturing cost of the electric motor can be lowered thereby.

According to still another form of the rotary electric machine, the field portion may comprise a plurality of permanent magnets disposed on the inner wall surface of the yoke at intervals. Therefore, a magnitude of the torque ripple can be reduced. Further, miniaturization, improvement of an assembly job and a cost reduction can be achieved.

What is claimed is:

1. A rotary electric machine, comprising:

a yoke;

a multi-polar magnetic field portion composed of 4 poles fixed to the inner wall of said yoke;

a shaft disposed within said yoke so as to be able to rotate freely;

an armature fixed to said shaft having a winding composed of a conductor wire wound by double wave winding into an even number of slots formed on the outer circumferential surface of a core so as to extend in the axial direction thereof;

a commutator comprising a plurality of segments fixed to an end portion of said shaft; and a plurality of brushes contacting the surface of said commutator.

2. A rotary electric machine according to claim 1, wherein the number of said slots is not an integer multiple of the number of said poles.

3. A rotary electric machine, comprising:

a yoke;

a multi-polar magnetic field portion composed of 4 poles fixed to the inner wall of said yoke;

a shaft disposed within said yoke so as to be able to rotate freely;

an armature fixed to said shaft having a winding composed of a conductor wire wound by double wave winding into a number of slots being an integer multiple of the number of pairs of said poles, said slots being formed on the outer circumferential surface of a core so as to extend in the axial direction thereof;

a commutator comprising a plurality of segments fixed to an end portion of said shaft; and a plurality of brushes contacting the surface of said commutator.

4. A rotary electric machine according to claim 3, wherein the number of said slots is an integer multiple of the number of said pole pairs and is not an integer multiple of the number of said poles.

5. A rotary electric machine, comprising:

a yoke;

a multi-polar magnetic field portion composed of at least 6 poles fixed to the inner wall of said yoke;

a shaft disposed within said yoke so as to be able to rotate freely;

an armature fixed to said shaft having a winding composed of a conductor wire wound by multiple wave winding into a number of slots being an integer multiple of the number of pairs of said poles and being not an integer multiple of the number of said poles, said slots being formed on the outer circumferential surface of a core so as to extend in the axial direction thereof;

a commutator comprising a plurality of segments fixed to an end portion of said shaft; and a plurality of brushes contacting the surface of said commutator.

6. A rotary electric machine according to any one of claim 1, 3 or 5 comprising an equalizer assembly having equalizer members electrically connected to said segments which are to have the same electric potential to prevent the generation of circulating currents running through said brushes due to differences in induced voltages between circuits in an armature circuit.

7. A rotary electric machine according to claim 6, wherein $$Ns/(n \times 2) \leq K \leq Ns$$

where, k represents the number of said equalizer members, Ns represents the number of said slots of said core, and n represent a maximum number of said segments covered by said brushes.

8. A rotary electric machine according to claim 6, wherein said equalizer members are disposed adjacent to said armature on the axial line thereof and laminated in the axial line.

9. A rotary electric machine according to claim 6, wherein the other end of an equalizer member, whose one end is connected to a segment, is connected to other segment through a slot.

10. A rotary electric machine according to claim 6, wherein said equalizer members are disposed inwardly of a cylindrical commutator main body composed of a plurality of said segments disposed in a circumferential direction.

11. A rotary electric machine according to claim 6, comprising a printed circuit board including an insulating substrate and said equalizer members electrically connected to said segments and composed of a conductive film formed on said insulating substrate.

12. A rotary electric machine according to claim 6, wherein said equalizer members are disposed in intimate contact with a side surface of said armature.

13. A rotary electric machine according to any one of claim 1, 3 or 5 wherein a current supplied to said winding is controlled by PWM (pulse width modulation) drive.

14. A rotary electric machine according to any one of claim 1, 3 or 5 wherein said conductor wire is an enameled round wire.

15. A rotary electric machine according to any one of claim 1, 3 or 5 wherein said field portion comprises a plurality of permanent magnets disposed on the inner wall surface of said yoke at intervals.

* * * * *